(12) United States Patent
Washino

(10) Patent No.: US 8,873,640 B2
(45) Date of Patent: *Oct. 28, 2014

(54) WIDE-BAND MULTI-FORMAT AUDIO/VIDEO PRODUCTION SYSTEM WITH FRAME RATE CONVERSION

(71) Applicant: Kinya Washino, Dumont, NJ (US)

(72) Inventor: Kinya Washino, Dumont, NJ (US)

(73) Assignee: Kinya Washino, Dumont, NJ (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/752,935

(22) Filed: Jan. 29, 2013

(65) Prior Publication Data

US 2013/0136427 A1 May 30, 2013

Related U.S. Application Data

(63) Continuation of application No. 13/114,411, filed on May 24, 2011, now Pat. No. 8,374,253, which is a (Continued)

(51) Int. Cl.
*H04B 1/66* (2006.01)
*H04N 7/01* (2006.01)

(Continued)

(52) U.S. Cl.
CPC ............... *H04N 5/91* (2013.01); *H04N 7/0125* (2013.01); *G11B 2220/2545* (2013.01);

(Continued)

(58) Field of Classification Search
CPC ..................... G11B 2220/20; G11B 2220/218; G11B 2220/2516; G11B 2220/2545; G11B 27/031; G11B 27/034; G11B 27/105; H04N 5/222; H04N 5/2228; H04N 5/46; H04N 5/772; H04N 5/781; H04N 5/85; H04N 5/91; H04N 7/01; H04N 7/011; H04N 7/0112; H04N 7/0122; H04N 7/0125
USPC ......... 348/448, 426, 432, 454, 558, 568, 535, 348/555, 556, 722, 911, 575; 375/240.01–240.29
See application file for complete search history.

(56) References Cited

U.S. PATENT DOCUMENTS

| 4,633,293 A | 12/1986 | Powers |
|---|---|---|
| 5,045,932 A | 9/1991 | Sharman et al. |

(Continued)

FOREIGN PATENT DOCUMENTS

| EP | 314873 | 5/1989 |
|---|---|---|
| EP | 514012 | 11/1992 |
| WO | 9315586 | 8/1993 |

OTHER PUBLICATIONS

G Demos, "An Example of Hierarchy of Formats for HDTV," SMPTE Journal, Sep. 1992, pp. 609-617.

(Continued)

*Primary Examiner* — Behrooz Senfi
(74) *Attorney, Agent, or Firm* — Law Office of R. Alan Burnett, PS; R. Alan Burnett

(57) ABSTRACT

A multi-format digital video production system enables a user to process an input video program to produce an output version of the program in a final format which may have a different frame rate, pixel dimensions, or both. An internal production format of 24 fps is preferably chosen to provide the greatest compatibility with existing and planned formats associated with HDTV standard 4:3 or widescreen 16:9 high-definition television, and film. Images are re-sized horizontally and vertically by pixel interpolation, thereby producing larger or smaller image dimensions so as to fill the particular needs of individual applications. Frame rates are adapted by inter-frame interpolation or by traditional schemes, including "3:2 pull-down" for 24-to-30 fps conversions. Simple speed-up (for 24-to-25 conversions) or slow-down (for 25-to-24 conversions) for playback, or by manipulating the frame rate itself using a program storage facility with asynchronous reading and writing capabilities. The step of converting the signal to a HDTV format is preferably performed using a modified upconversion process for wideband signals (utilizing a higher sampling clock frequency) and a resizing to HDTV format frame dimensions in pixels.

48 Claims, 14 Drawing Sheets

Related U.S. Application Data continuation of application No. 12/348,804, filed on Jan. 5, 2009, now Pat. No. 8,228,979, which is a continuation of application No. 10/117,496, filed on Apr. 5, 2002, now Pat. No. 7,474,696, which is a continuation of application No. 09/305,953, filed on May 6, 1999, now Pat. No. 6,370,198, which is a continuation-in-part of application No. 08/834,912, filed on Apr. 7, 1997, now Pat. No. 5,999,220.

(60) Provisional application No. 60/084,522, filed on May 7, 1998.

(51) Int. Cl.
| | | |
|---|---|---|
| *G11B 27/034* | (2006.01) | |
| *H04N 5/222* | (2006.01) | |
| *H04N 5/91* | (2006.01) | |
| *G11B 27/10* | (2006.01) | |
| *H04N 5/46* | (2006.01) | |
| *H04N 5/85* | (2006.01) | |
| *H04N 9/79* | (2006.01) | |
| *G11B 27/031* | (2006.01) | |
| *H04N 5/781* | (2006.01) | |
| *H04N 5/77* | (2006.01) | |

(52) U.S. Cl.
CPC .............. *H04N 5/85* (2013.01); *G11B 27/034* (2013.01); *H04N 7/011* (2013.01); *G11B 2220/218* (2013.01); *H04N 5/2228* (2013.01); *H04N 5/46* (2013.01); *H04N 7/01* (2013.01); *H04N 9/7925* (2013.01); *H04N 5/222* (2013.01); *H04N 9/7921* (2013.01); *G11B 2220/20* (2013.01); *G11B 2220/2516* (2013.01); *G11B 27/031* (2013.01); *H04N 5/781* (2013.01); *H04N 7/0112* (2013.01); *H04N 5/772* (2013.01); *G11B 27/105* (2013.01); *H04N 7/0122* (2013.01)
USPC .................................... 375/240.26; 348/441

(56) References Cited

U.S. PATENT DOCUMENTS

| | | |
|---|---|---|
| 5,243,433 A | 9/1993 | Hailey et al. |
| 5,327,235 A | 7/1994 | Richards et al. |
| 5,331,346 A | 7/1994 | Shields et al. |
| 5,384,598 A | 1/1995 | Rodriguez et al. |
| 5,444,491 A | 8/1995 | Lim |
| 5,444,492 A * | 8/1995 | Kihara .......................... 348/445 |
| 5,519,438 A | 5/1996 | Elliott et al. |
| 5,532,749 A | 7/1996 | Hong et al. |
| 5,537,157 A | 7/1996 | Washino et al. |
| 5,600,377 A | 2/1997 | David et al. |
| 5,608,464 A | 3/1997 | Woodham et al. |
| 5,617,218 A | 4/1997 | Rhodes |
| 5,701,383 A | 12/1997 | Russo et al. |
| 5,706,290 A | 1/1998 | Shaw et al. |
| 5,724,101 A | 3/1998 | Haskin |
| 5,754,248 A | 5/1998 | Faroudja |
| 5,771,073 A | 6/1998 | Lim |
| 5,812,204 A | 9/1998 | Baker et al. |
| 5,832,085 A | 11/1998 | Inoue et al. |
| 5,835,150 A | 11/1998 | Choi et al. |
| 5,838,381 A | 11/1998 | Kasahara et al. |
| 5,999,220 A | 12/1999 | Washino |
| 6,356,945 B1 | 3/2002 | Shaw et al. |
| 6,370,198 B1 | 4/2002 | Washino |
| 6,542,198 B1 | 4/2003 | Hung et al. |
| 6,656,945 B2 | 12/2003 | Campbell et al. |

OTHER PUBLICATIONS

J.S. Lim, "A Proposal for an HDTV/ATV Standard with Multiple Transmission Formats," SMPTE Journal, Aug. 1993, pp. 699-702.

W.E. Bretl, "3SNTSC-A 'Leapfrog' Production Standard for HDTV," SMPTE Journal, Mar. 1989, pp. 173-178.

B. Hunt, G. Kennel, L. DeMarsh, S. Kristy, "High-Resolution Electronic Intermediate System for Motion-Picture Film,"SMPTE Journal, Mar. 1991, pp. 156-161.

A. Kaiser, H. Mahler, R., McMann, "Resolution Requirements for HDTV Based Upon the Performance of 35mm Motion-Picture Films for Theatrical Viewing," SMPTE Journal, Jun. 1985, pp. 654-659.

Y. Ide, M. Sasuga, N. Harada, T. Nishizawa, "A Three-CCD HDTV Color Camera," SMPTE Journal, Jul. 1990, pp. 532-537.

G. Reitmeier, C. Carlson, E. Geiger, D. Westerkamp, "The Digital Hierarchy—A Blueprint for Television in the 21st Century," SMPTE Journal, Jul. 1992, pp. 466-470.

L. Thorpe, T. Hanabusa, "If Progressive Scanning is So Good, How Bad is Interlace?", SMPTE Journal, Dec. 1990, p. 972-86.

* cited by examiner

FIGURE 7A

| Output / Source | 24fps Interlace (24fps I) | 24fps Progress. (24fps P) | 25fps Interlace (25fps I) | 25fps Progress. (25fps P) | 30fps Interlace (30fps I) | 30fps Progress. (30fps P) | 48fps Progress. (48fps P) | 50fps Progress. (50fps P) | 60fps Progress. (60fps P) | 96fps Progress. (96fpsP) |
|---|---|---|---|---|---|---|---|---|---|---|
| 24fps Interlace (24fps I) | — | 2:1 Frame Reduction From 48fps P (2) | Speed-up From 24fps I (1) | 2:1 Frame Reduction From 50fps P (3) | Interlace & discard From 60fps P (3) | 2:1 Frame Reduction From 60fps P (3) | De-Interlace From 24fps I (1) | De-Interlace From 25fps I (2) | 4th Frame Repeat From 48fps P (2) | Repeat From 48fps P (2) |
| 24fps Progress. (24fps P) | Interlace From 24fps P (1) | — | Speed-up From 24fps P (2) | — | 3:2 Pull-down From 24fps I (2) | 2:1 Frame Reduction From 60fps P (2) | Repeat From 24fps P (1) | Repeat From 25fps P (2) | 3:2 Frame Repeat From 24fps P (2) | Repeat From 48fps P (2) |
| 25fps Interlace (25fps I) | Slow-Down From 25fps I (1) | 2:1 Frame Reduction From 48fps P (3) | — | 2:1 Frame Reduction From 50fps P (2) | Interlace & discard From 60fps P (4) | 2:1 Frame Reduction From 60fps P (4) | De-Interlace From 24fps I (2) | De-Interlace From 25fps I (1) | 4th Frame Repeat From 48fps P (3) | Repeat From 48fps P (3) |
| 25fps Progress. (25fps P) | Interlace From 24fps P (2) | Slow-down From 25fps P (1) | Interlace From 25fps P (1) | — | 3:2 Pull-down From 24fps I (3) | 2:1 Frame Reduction From 60fps P (4) | De-Interlace From 24fps I (3) | Repeat From 25fps P (1) | 3:2 Frame Repeat From 24fps P (2) | Repeat From 48fps P (3) |
| 30fps Interlace (30fps I) | 5th Fr. red., Interlace & Disc. Frm. 60fps P (2) | 2:1 Frame Reduction From 48fps P (3) | 6th Fr. red Interlace & Disc. Frm. 60fps P (2) | 2:1 Frame Reduction From 50fps P (3) | — | 2:1 Frame Reduction From 60fps P (2) | De-Interlace From 24fps I (3) | De-Interlace From 25fps I (3) | De-Interlace From 30fps I (1) | Repeat From 48fps P (3) |

FIGURE 7A (CONT)

| | 5th Fr. red., Interlace & Disc. Frm. | 2:1 Frame Reduction | 6th Fr. red Interlace & Disc. Frm. | 2:1 Frame Reduction | Interlace | | De-Interlace | De-Interlace | Repeat |
|---|---|---|---|---|---|---|---|---|---|
| 30fps Progress. (30fps P) | 5th Fr. red., Interlace & Disc. Frm. 60fps P (2) | 2:1 Frame Reduction From 48fps P (4) | 6th Fr. red Interlace & discard Frm. 60fps P (2) | 2:1 Frame Reduction From 50fps P (4) | Interlace From 30fps P (1) | | De-Interlace From 24fps I (3) | Repeat From 30fps P (1) | Repeat From 48fps P (4) |
| 48fps Progress. (48fps P) | Interlace From 24fps P (2) | 2:1 Frame Reduction From 48fps P (1) | Interlace From 25fps P (3) | Speed-up From 24fps P (2) | 3:2 Pull-down From 24fps I (3) | 2:1 Frame Reduction From 60fps P (2) | | De-Interlace From 25fps I (4) | Repeat From 48fps P (1) |
| 50fps Progress. (50fps P) | Interlace From 24fps P (3) | Slow-down From 25fps P (2) | Interlace & discard From 50fps P (1) | 2:1 Frame Reduction From 50fps P (1) | 3:2 Pull-down From 24fps I (4) | 2:1 Frame Reduction From 60fps P (3) | De-Interlace From 24fps I (4) | | 3:2 Frame Repeat From 24fps P (3) |
| 60fps Progress. (60fps P) | 5th Fr. red., Interlace & Disc. Frm. 60fps P (1) | 2:1 Frame Reduction From 48fps P (4) | 6th Fr. red Interlace & Disc. Frm. 60fps P (1) | 2:1 Frame Reduction From 50fps P (4) | Interlace & discard From 60fps P (1) | 2:1 Frame Reduction From 60fps P (1) | De-Interlace From 24fps I (3) | De-Interlace From 25fps I (2) | Repeat From 48fps P (4) |
| 96fps Progress. (96fps P) | Interlace From 24fps P (3) | 2:1 Frame Reduction From 48fps P (2) | Speed-up From 24fps P (4) | Speed-up From 24fps P (3) | 3:2 Pull-Down From 24fps I (4) | 2:1 Frame Reduction From 60fps P (3) | 2:1 Frame Reduction From 96fps P (1) | De-Interlace From 25fps I (5) | 4th Frame Repeat From 48fps P (2) |

Figure 7c        3 : 2 Pull-Down
                 (24 fps P to 30 fps I)
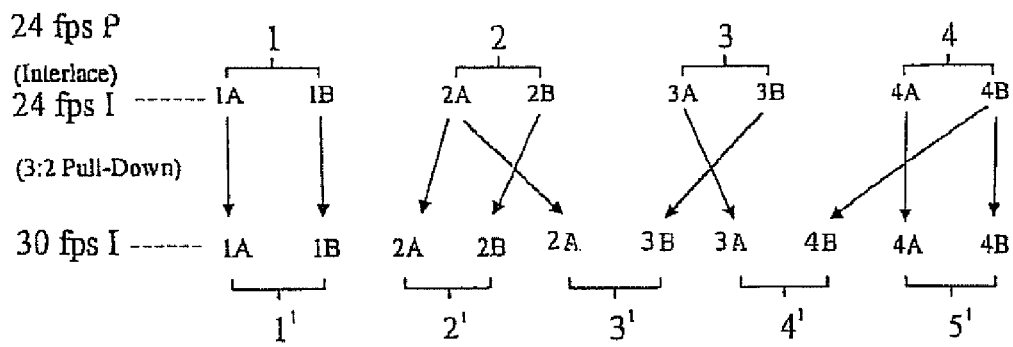
Figure 7e        4th & 7th Field Repeat plus Re-Interlace
                 (24 fps I to 30 fps I)
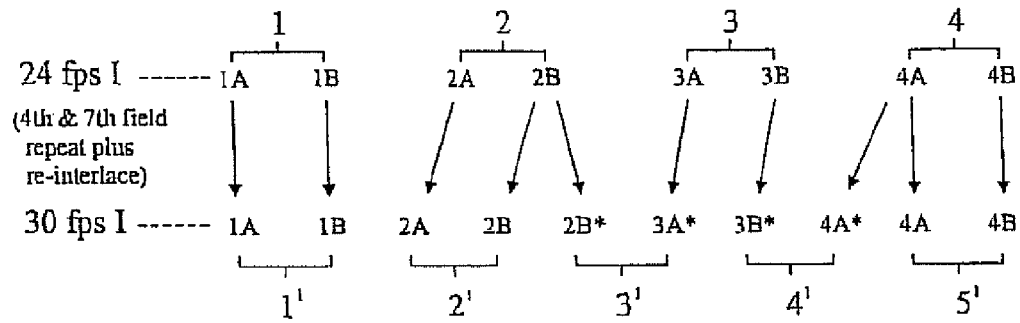
* Revresed- Field
Figure 7g        3 : 2 Frame Repeat   (24 fps P to 60 fps P)
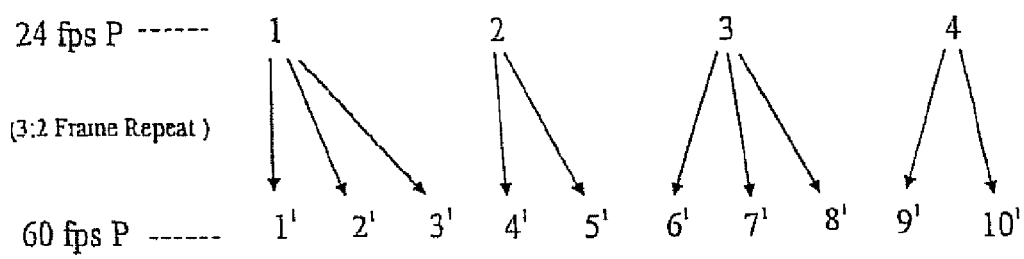

Figure 7d    25 fps Interlace to 30 fps Interlace Conversion
(from PAL CCD camera source to NTSC out)
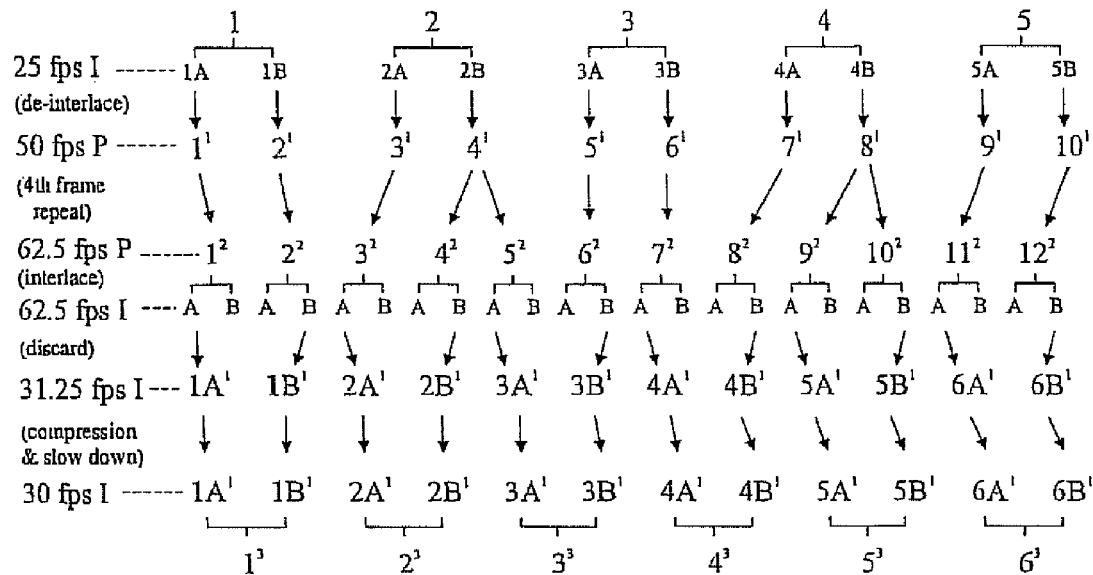
Figure 7f    4th Frame Repeat (24fps I to 30fps I)
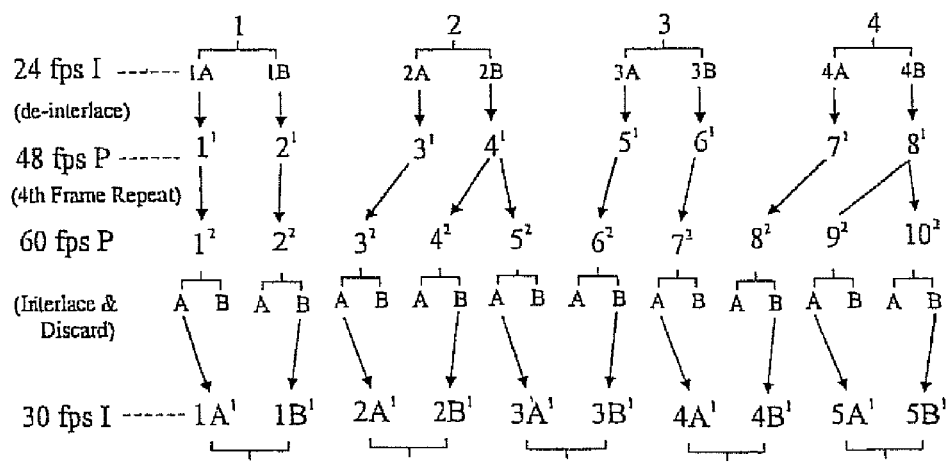

Figure 7h       6th Frame Reduction (30fps I to 25fps I)
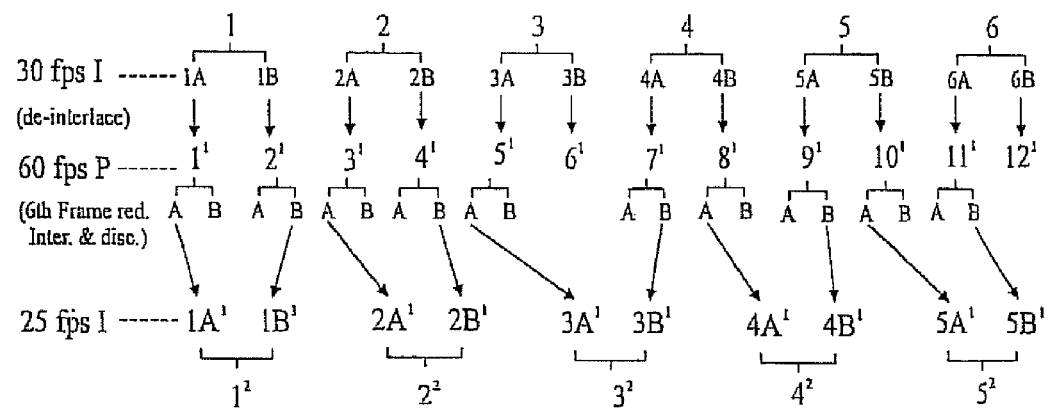
Figure 7i       5th Frame Reduction (30fps I to 24fps I)
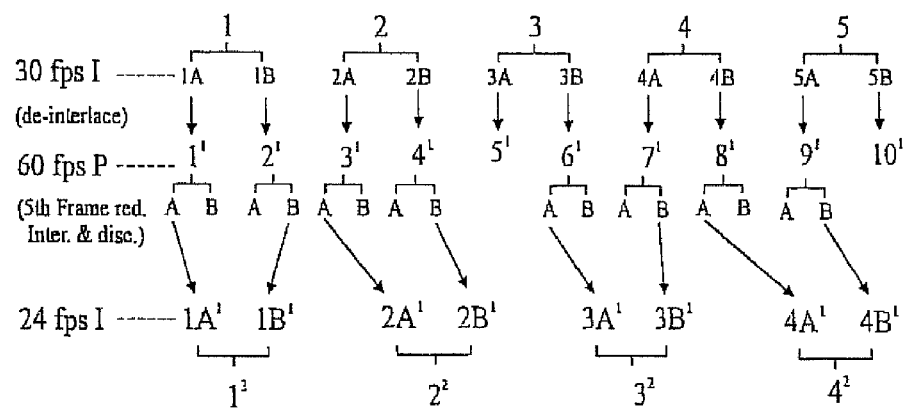

WIDE-BAND MULTI-FORMAT AUDIO/VIDEO PRODUCTION SYSTEM WITH FRAME RATE CONVERSION

CROSS-REFERENCE TO RELATED APPLICATIONS

This application is a continuation of U.S. patent Ser. No. 13,114,411 filed May 24, 2011, which is a continuation of U.S. patent application Ser. No. 12/348,804 filed Jan. 5, 2009 which is a continuation of U.S. patent application Ser. No. 10/117,496 filed Apr. 5, 2002; which is a continuation of U.S. patent application Ser. No. 09/305,953 filed May 6, 1999, now U.S. Pat. No. 6,370,198; which is a continuation-in-part of U.S. patent application Ser. No. 08/834,912, filed Apr. 7, 1997, now U.S. Pat. No. 5,999,220; and also claims priority of U.S. Provisional Patent Application Ser. No. 60/084,522, filed May 7, 1998. All of these prior applications are incorporated herein by reference in their entirety.

FIELD OF THE INVENTION

This invention relates generally to video production, photographic image processing, and computer graphics, and, more particularly, to a multi-format digital video production system capable of maintaining the full bandwidth resolution of the subject material, while providing professional quality editing and manipulation of images intended for digital television and other applications, including digital HDTV programs.

BACKGROUND OF THE INVENTION

As the number of television channels available through various program delivery methods digital TV (DTV) broadcasting, cable TV, home video, broadcast, etc. continues to proliferate, the demand for programming, particularly high-quality HDTV-format programming, presents special challenges, both technical and financial, to program producers. While the price of professional editing and image manipulation equipment continues to increase, due to the high cost of research and development and other factors, general-purpose hardware, including personal computers, can produce remarkable effects at a cost well within the reach of non-professionals, even novices. As a result, the distinction between these two classifications of equipment has become less well defined. Although general-purpose PC-based equipment may never allow professional-style rendering of images at full resolution in real-time, each new generation of microprocessors enables progressively faster, higher-resolution applications. In addition, as the price of memory circuits and other data storage hardware continues to fall, the capacity of such devices has risen dramatically, thereby improving the prospects for enhancing PC-based image manipulation systems for such applications.

In terms of dedicated equipment, attention has traditionally focused on the development of two kinds of professional image-manipulation systems: those intended for the highest quality levels to support film effects, and those intended for television broadcast to provide "full 35 mm theatrical film quality," within the realities and economics of present broadcasting systems. Conventional thinking holds that 35 mm theatrical film quality as projected in theaters is equivalent to 1200 or more lines of resolution, whereas camera negatives provide 2500 or more lines. As a result, image formats under consideration have been directed towards video systems having 2500 or more scan lines for high-level production, with hierarchies of production, HDTV broadcast, and NTSC and PAL compatible standards which are derived by down-converting these formats. Most proposals employ progressive scanning, although interlace is considered an acceptable alternative as part of an evolutionary process. Another important issue is adaptability to computer-graphics-compatible formats.

Current technology directions in computers and image processing should allow production equipment based upon fewer than 12200 scan lines, with picture expansions to create a hierarchy of upward-converted formats for theatrical projection, film effects, and film recording. In addition, general-purpose hardware enhancements should be capable of addressing the economic aspects of production, a subject not considered in detail by any of the available references.

For the first fifty years of television in the United States, the history shows continuous development and improvement of a purely analog-based system for video production broadcasting. The nature of the NTSC system is to limit the video bandwidth to 4.2 MHZ, which corresponds to approximately 340 TV-lines of resolution. In countries where PAL or SECAM systems are employed, the bandwidth is 5.5 MHZ, which corresponds to approximately 440 TV-lines of resolution.

During the past ten years, digital processing has become the standard for video production equipment. However, to preserve compatibility with existing equipment and standards, the video bandwidth typically has been limited to 4-6 MHZ (for NTSC and PAL applications, respectively). This also has tended to reduce the apparent generation loss during video production steps.

In the past five years or so, digital image compression technology has matured greatly. Furthermore, there are many incompatible standards, such as the different forms of JPEG systems, the-Quick-Time system, MPEG-1, and the numerous forms of the MPEG-2 standard. In addition, the latest recording formats for video production have introduced a new set of variations, including the ¼-inch DVC-formats from Sony and Matsushita. While the signal deterioration characteristics of multi-generation analog-based production systems are well known, those imperfections resulting from diverse-format digital video compression and the conversions between these formats can be just as troublesome and unpredictable. In practice, these repeated steps of analog-to-digital (A/D) conversion and digital-to-analog (D/A) conversion, as well as data compression and decompression, introduce many signal artifacts and various forms of signal noise. Although digital video production promises multiple-step production processes free of generation losses, the reality is different, due to the repeated steps of A/D and D/A conversions, as well as data compression and decompression, present when utilizing the various incompatible image data compression formats.

Meanwhile, during the last twenty years, camera technology has advanced to a point far surpassing the performance of traditional production equipment. The video bandwidth capability has increased from 4.2 MHZ (corresponding to 340 TV-lines of resolution) to approximately 12 MHZ (corresponding to nearly 1000 TV-lines of resolution). Because of the limitations of conventional broadcast and production equipment, most of the detail information produced by today's high-performance camera systems is lost.

For HDTV systems, one goal is to produce images having approximately 1000 TV-lines of resolution per picture height, which requires a bandwidth of approximately 30 MHZ. This, in turn, raises a new problem in terms of signal-to-noise ratio. While conventional broadcast cameras can produce signals having a S/N ratio of 65 dB, utilizing 10-bit digital processing, HDTV cameras typically produce signals having a S/N ratio of 54 dB, and utilize only 8-bit digital processing. In addition, the typical HDTV camera utilizes a 2 Megapixel CCD, in which the elements are approximately one-quarter the size of conventional broadcast cameras. This translates into a much lower sensitivity (a loss corresponding to 1-2 lens f-stops), higher levels of "smearing", and lower highlight compression ratios.

Analog-based HDTV systems, such as the Japanese MUSE system, do not approach the design goal of 1000 TV-lines. In reality, only one quarter of the picture information is transmitted. Although the nominal reduced luminance bandwidth of 20 MHZ provides approximately 600 TV-lines of resolution per picture height in static program material, this resolution is drastically reduced to only 450 TV-lines where motion is occurring. The chrominance bandwidth is even further reduced by the sub-sampling scheme, to 280 TV-lines for the I-signal and 190 TV-lines for the Q-signal (in static scenes), and to 140 TV-lines for the 1-signal and 50 TV-lines for the Q-signal (in moving scenes). Although this system provides a wide-screen aspect ratio of 16:9, it does not really qualify as a High-Definition Television System.

Because of the aforementioned compatibility issues, it is clear that conventional video recorders cannot match the technical performance of modern camera systems. Although "D-6 format" digital recorders are available, the cost and complexity of such equipment place these units beyond the means of the vast majority of broadcast stations. Furthermore, the capability of conventional switchers and other production equipment still fail to match that of available camera systems.

Other recorders have been produced, such as the one-half-inch portable recorder ("Uni-HI"), but this system only achieves 42 dB signal-to-noise ratio, and records in the analog domain. These specifications render this unit unsuitable for multi-generation editing applications. Furthermore, the luminance bandwidth is only 20 MHZ, corresponding to approximately 600 TV-lines of resolution.

W-VHS ("Wideband-VHS") recorders provide a wide aspect-ratio image, but only 300 TV-lines of resolution, which also renders this unit unsuitable for any professional applications. Other distribution formats (such as D-VHS) require the application of high compression ratios to limit the data-rate to be recorded, so these formats only achieve W-VHS quality (less than 400 TV-lines of resolution).

The newly-introduced HD Digital Betacam format (HD-CAM) video recorder utilizes a 3:1:1 digital processing system rather than the 4:2:2 processing. However, it has a 24 MHZ luminance bandwidth corresponding to 700 TV-lines of resolution, and a narrower chrominance bandwidth. Although this system is clearly superior to any existing analog HDTV recording system, it still falls short of delivering the full resolution produced by an HDTV digital camera. Because of its proprietary image data compression format, the production process results in repeated data compression and decompression steps, as well as A/D and D/A conversions, which, in turn, results in many signal artifacts and various forms of signal noise.

In summary, the conventional technology for these markets utilizes professional cameras having a 30 MHZ bandwidth, and capable of 1000 TV-lines of resolution. However, they produce quality levels more characteristic of consumer-grade equipment (in terms of resolution and signal-to-noise ratio). In addition, the price of these systems is cost-prohibitive both on an absolute and also a cost/benefit basis, employing digital systems which produce only analog-type performance.

SUMMARY OF THE INVENTION

The present invention takes advantage of available general-purpose technology, where possible, in order to provide an economical multi-format digital video production system. In the preferred embodiment, specialized graphics processing capabilities are included in a high-performance personal computer or workstation, enabling the user to edit and manipulate an input video program and produce an output version of the program in a final format which may have a different frame rate, pixel dimensions, or both. An internal production format is chosen which provides the greatest compatibility with existing and planned formats associated with HDTV standard 4:3 or widescreen 16:9 high-definition television, and film. For compatibility with film, the frame rate of the internal production format preferably is 24 fps (for program materials originated in film format) and 48 fields-per-second (for live program materials such as sporting events). Images are re-sized horizontally and vertically by pixel interpolation, thereby producing larger or smaller image dimensions so as to fill the particular needs of individual applications. Frame rates are adapted by inter-frame interpolation or by traditional schemes, including "3:2 pull-down" for 24-to-30 fps conversions. Simple speed-up (for 24-to-25 conversions) or slow-down (for 25-to-24 conversions) for playback, or by manipulating the frame rate itself using a program storage facility with asynchronous reading and writing capabilities. The step of converting the signal to a HDTV format is performed by a modified upconversion process for wideband signals (utilizing a higher sampling clock frequency) and a resizing to HDTV format frame dimensions in pixels.

The invention preferably incorporates one or more interface units, including a standard/widescreen interface unit operative to convert the video program in the input format into an output signal representative of a standard/widescreen formatted image, and output the signal to an attached display device. A high-definition television interface unit is operative to convert the video program in the input format into an output signal representative of an HDTV-formatted image, and output the signal to the display device. A centralized controller in operative communication with the video program input, the graphics processor, and an operator interface, enables commands entered by an operator to cause the graphics processor to perform one or more of the conversions using the television interfaces. The present invention thus encourages production at relatively low pixel dimensions to make use of lower-cost general-purpose technology and to maintain high signal-to-noise ratio, and then subsequently expands the resultant image into a so-called up-converted program. This is in contrast to alternative approaches, which recommend operating at HDTV-type resolution, then down-converting, as necessary, to smaller image formats. This has led to the use of expensive dedicated hardware, the need for which the present invention seeks to eliminate. In addition, the flexible storage and playback facilities allow extensive control of the playback of the program material, enabling frame rate adjustments and alterations, and providing for time-shifting of the start and end points of the program reproduction in those cases wherein direct control of the source material frame rate is not practical, due to physical separation of the equipment or multiple reception points simultaneously producing outputs at different frame rates from the same source signal playback data stream. In commercial implementations, the invention readily accepts and processes enhanced information, such as pan/scan information or identification information to restrict viewing based on regional or geographical marketing plans.

The method and associated technology provide for maintaining the original high bandwidth of conventional cameras (up to 15 MHZ, which corresponds to more than 600 TV-lines of resolution-per picture height for 16:9 aspect ratio) and provide optimized compression techniques to fully utilize the available capacity of general storage media, such as the commercially available Panasonic DVCPRO, DVCPRO50, Sony DVCAM, JVC Digital-S, and Sony Betacam SX recorders. The system preferably employs a consistent compression scheme, utilizing only intra-frame compression (such as Motion-JPEG-type systems, systems used in DV-format recorders, MPEG-2 4:2:2 P@ML) throughout the entire production process. This avoids many signal artifacts, ensures high signal-to-noise ratios, and provides for editing the program material in data-compressed format. This enables the system to preserve the original camera capability of 600+ TV-lines of resolution per picture height, and with 4:2:2 processing provides a chrominance bandwidth of up to 7.5 MHZ. Utilizing 10-bit processing results in 65 dB signal-to-noise performance and improved camera sensitivity (rating of f-11). In contrast, available and proposed systems for HDTV are based on 8-bit processing, and offer performance of less than 54 dB signal-to-noise ratio and camera sensitivity rating of only f-8.

The invention provides for optimization of the available storage media as well. Utilizing hard-disks, optical discs (such as DVD, DVD-R, and DVD-RAM), magneto-optical discs, or digital tapes (such as DAT-format, DVC, DVCPRO, DVCPRO50, DVCAM, Digital-S, or 8-mm format) the data-rate to be recorded is nearly one-quarter-that of conventional HDTV systems, and consumes only 20 GB of storage space to record more than 60 minutes in the Production Format compression scheme, which utilizes a data-rate of 50 Mb per second or less, which is well within the capabilities of certain conventional recording devices. Horizontal and vertical pixel-interpolation techniques are utilized to quadruple the image size, preferably resulting in an image frame size of 1920×1080 pixels. The resulting program information may then be distributed in a conventional compression format, such as MPEG-2.

Three alternative image frame sizes preferably are suggested, depending on the intended application. For general usage, an image frame size of 1024×576 is recommended. As an option, a frame size of either 1280×720 or 1920×1080 may be utilized, at 24 frames-per-second. A sampling frequency of up to 74.25 MHZ for luminance is utilized for 1920×1080. Sampling frequencies of up to 37 MHZ are preferably are utilized for 1024×576 and 1280×720. Chrominance components preferably are sampled consistent with a 4:2:2 system, and 10-bit precision is preferred.

The technology of display devices and methodology has progressed as well, offering alternative features such as conversion of interlaced signals to progressive scan, line doubling, pixel quadrupling, and improved general techniques for horizontal and vertical pixel interpolation. Availability of these features as part of display devices will simplify the process of implementing multi-format digital production.

BRIEF DESCRIPTION OF THE DRAWINGS

FIGS. 7A-7B show the preferred methods for conversion between several of the most common frame-rate choices;

FIGS. 7C-7I show details of possible methods for frame rate conversion processes.

DETAILED DESCRIPTION OF THE INVENTION

Figure 7B:
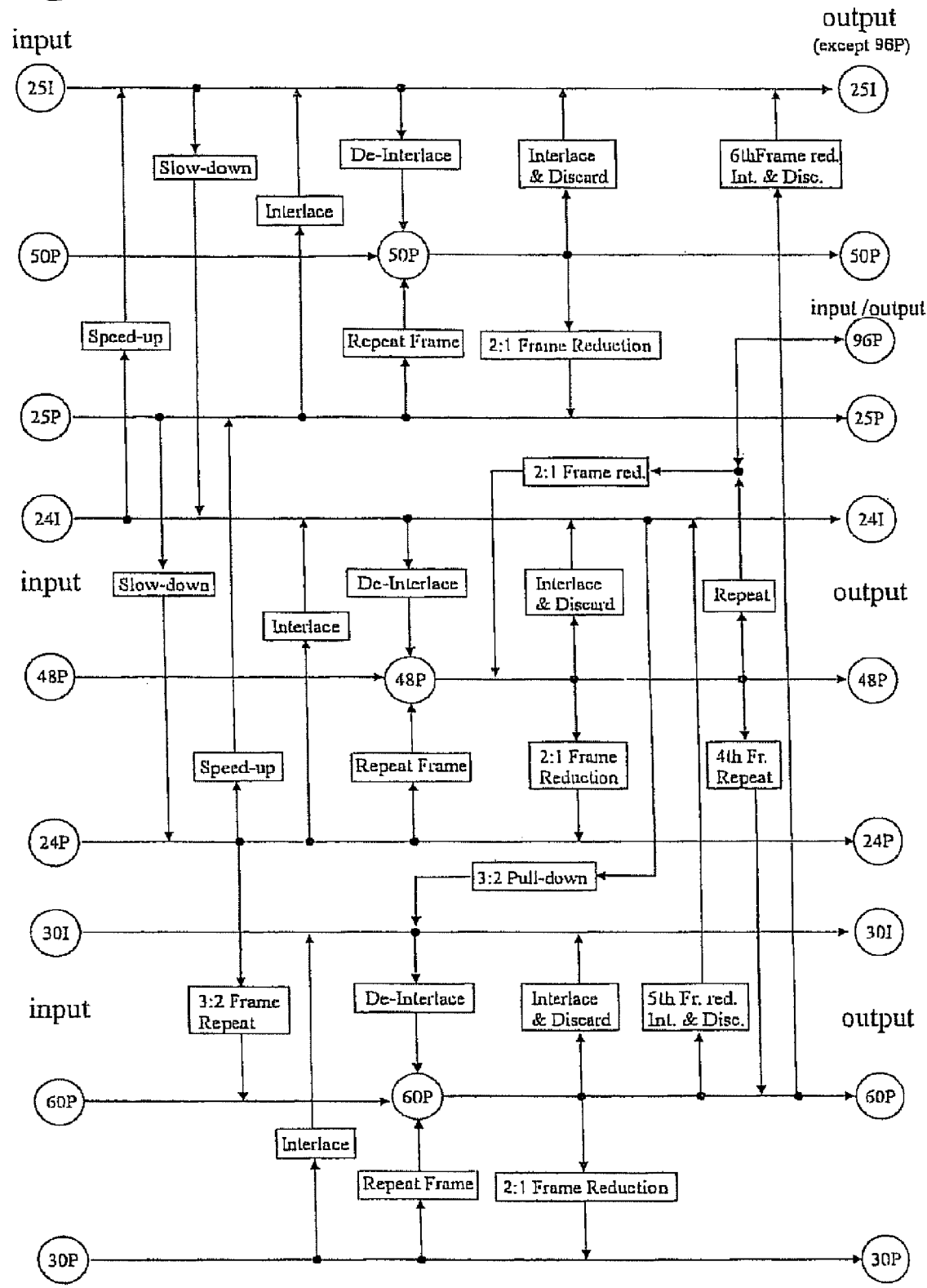

The present invention resides in the conversion of disparate graphics or television formats, including requisite frame-rate conversions, to establish an inter-related family of aspect ratios, resolutions, and frame rates, while remaining compatible with available and future graphics/TV formats, including images of pixel dimensions capable of being displayed on currently available multi-scan computer monitors. Custom hardware is also disclosed whereby frames of higher pixel-count beyond the capabilities of these monitors may be viewed. Images are re-sized by the system to larger or smaller dimensions so as to fill the particular needs of individual applications, and frame rates are adapted by inter-frame interpolation or by traditional schemes such as using "3:2 pull-down" (such as 24 frame-per-second (fps) Progressive to 30 fps interlace shown in FIG. 7C or 48 fps Progressive to 60 fps Progressive, as would be utilized for film-to-NTSC conversions) or by speeding up the frame rate itself (such as for 24 to 25 fps for PAL television display). The re-sizing operations may involve preservation of the image aspect ratio, or may change the aspect ratio by "cropping" certain areas, by performing non-linear transformations, such as "squeezing" the picture, or by changing the vision center for "panning," "scanning" and so forth. Inasmuch as film is often referred to as "the universal format," (primarily because 35-mm film equipment is standardized and used throughout the world), the preferred internal or "production" frame rate is preferably 24 fps. This selection also has an additional benefit, in that the 24 fps rate allows the implementation of cameras having greater sensitivity than at 30 fps, which is even more critical in systems using progressive scanning (for which the rate will be 48 fields per second interlaced (or 24 fps Progressive) vs. 60 fields per second interlaced in some other proposed systems).

The image dimensions chosen allow the use of conventional CCD-type cameras, but the use of digital processing directly through the entire signal chain is preferred, and this is implemented by replacing the typical analog RGB processing circuitry with fully digital circuitry. Production effects may be conducted in whatever image size is appropriate, and then re-sized for recording. Images are recorded by writing the digital data to storage devices employing internal or removable hard-disk drives, disk drives with removable media, optical or magneto-optical based drives, DVD-R or DVD-RAM type drives, tape-based drives, or semiconductor-based memory devices, preferably in compressed-data form.

As data rates for image processing and reading from, or writing to, disk drives increase, many processes that currently require several seconds will soon become attainable in real-time. This will eliminate the need to record film or video frames at slower rates. Other production effects, such as slow-motion or fast-motion may be incorporated, and it is only the frame-processing-rate of these effects that is limited in any way by the technology of the day. In particular, techniques such as non-linear-editing, animation, and special-effects will benefit from the implementation of this system. In terms of audio, the data rate requirements are largely a function of sound quality. The audio signals may be handled separately, as in an "interlocked" or synchronized system for production, or the audio data may be interleaved within the video data stream. The method selected will depend on the type of production manipulations desired, and by the limitations of the current technology.

Figure 1A:
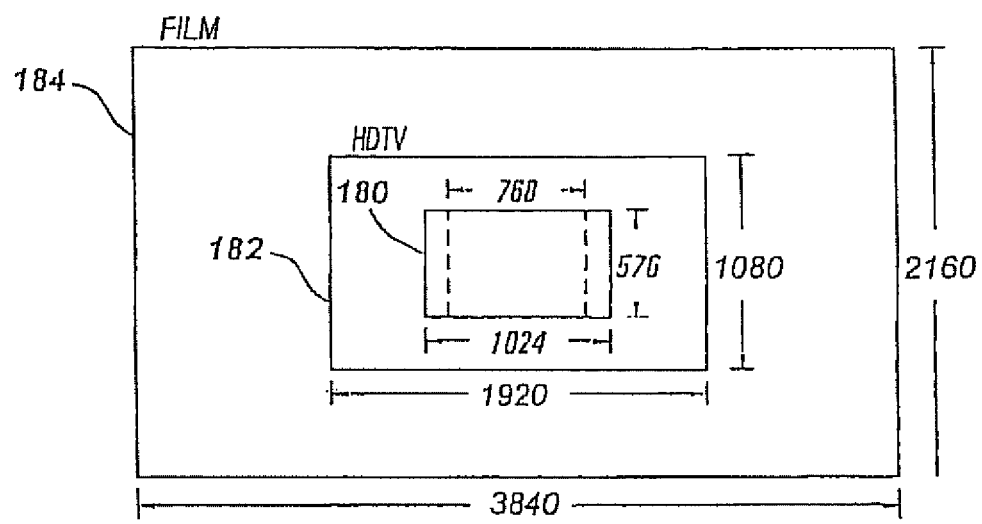
FIGS. 1A-1D show the preferred and alternative image aspect ratios in pixels.

Although a wide variety of video formats and apparatus configurations are applicable to the present invention, the system will be described in terms of the alternatives most compatible with currently available equipment and methods. FIG. 1A illustrates one example of a compatible system of image sizes and pixel dimensions. The selected frame rate is preferably 24 per second progressive (for compatibility with film elements), or 48 fields per second interlaced (for live program material such as sporting events). The selected picture dimension in pixels is preferably 1024×576 (0.5625 Mpxl), for compatibility with the Standard Definition TV (SDTV) 16:9 "wide-screen" aspect ratio anticipated for HDTV systems, and the conventional 4:3 aspect ratio used for PAL systems [768×576 (0.421875 Mpxl)] or NTSC systems [640×480 (0.3072 Mpxl)]. All implementations preferably rely on square pixels, though other pixel shapes may be used. Re-sizing (using the well known, sophisticated sampling techniques available in many image-manipulation software packages or, alternatively, using horizontal and vertical pixel interpolation hardware circuitry described herein below) either to 1280×720 (0.922 Mpxl) or else to 1920×1080 (2.14 Mpxl) provides an image suitable for HDTV displays or even theatrical projection systems, and a further re-sizing to 3840×2160 (8.3 Mpxl) is appropriate for even the most demanding production effects. Images may be data compressed, preferably 5:1 with Motion-JPEG-type compression such as utilized in DV-format equipment, or preferably 10:1 with MPEG2 4:2:2 P@ML compression.

In order to preserve the full bandwidth of this high-resolution signal, a higher sampling frequency is required for encoding, preferably approximately 20 MHZ, for 1024×576 at 24 fps, which results in 1250 samples per total line, with 625 total lines per frame. This sampling rate allows processing a 10 MHZ bandwidth luminance signal, which corresponds to approximately 600 TV lines of resolution per picture height. In contrast, traditional SDTV digital component systems employ a sampling frequency of 13.5 MHZ, which provides a luminance bandwidth of 5 to 6 MHZ (approximately 300 to 360 TV lines of resolution per picture height. These wide-band data files may then be stored on conventional magnetic or optical disk drives, or tape-based storage units, requiring only approximately 5.5 MB/sec for SDTV wide-screen frames in Y/R-Y/B-Y (assuming a 4:2:2 system at 8 bits per sample). The resultant data rate for this system is less than 50 Megabits per second, which is within the capabilities of currently available video recording equipment, such as the Betacam SX, DVCPRO50 or Digital S50. If a higher data-compression ratio is applied, then other units may be used, such as DVC, DVCPRO or DVCAM; Betacam SX, DVCPRO50 or Digital S50 may be used to allow sampling to 10-bit precision rather than 8-bit precision.

Figure 1B:
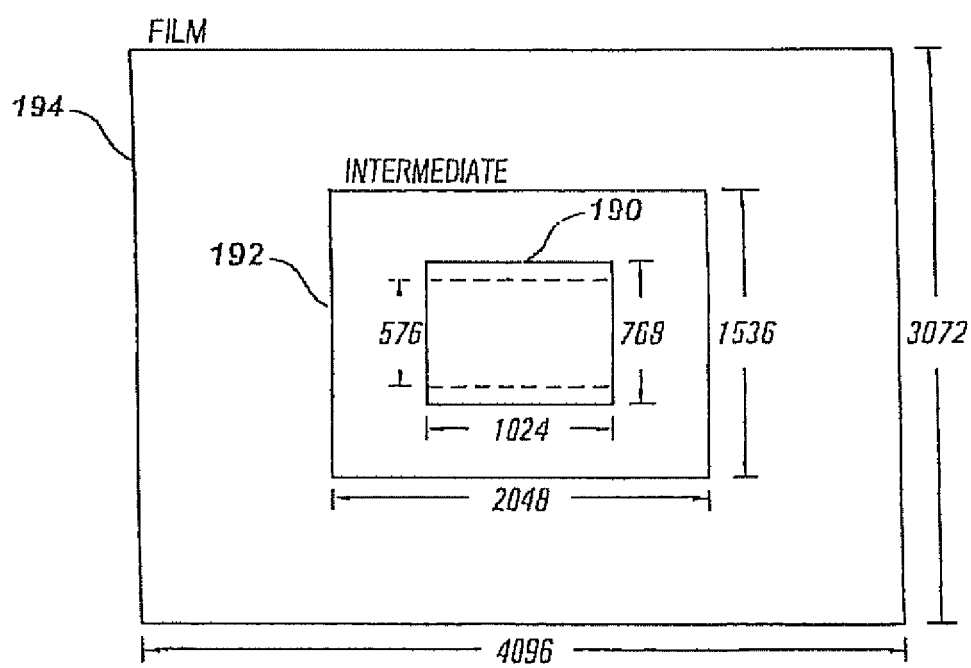

An alternative aspect of the invention is shown in FIG. 1B. In this case, the user follows a technique commonly used in film production, in which the film is exposed as a 4:3 aspect ratio image. When projected as a wide-screen format image, the upper and lower areas of the frame may be blocked by an aperture plate, so that the image shows the desired aspect ratio (typically 1.85:1 or 1.66:1). If the original image format were recorded at 24 frames per second, with a 4:3 ratio and with a dimension in pixels of 1024×768, all image manipulations would preserve these dimensions. Complete compatibility with the existing formats would result, with NTSC and PAL images produced directly from these images by re-scaling, and the aforementioned wide-screen images would be provided by excluding 96 rows of pixels from the top of the image and 96 rows of pixels from the bottom of the image, resulting in the 1024×576 image size as disclosed above. The data content of each of these frames would be 0.75 Mpxls, and the data storage requirements disclosed above would be affected accordingly.

Figure 1C:
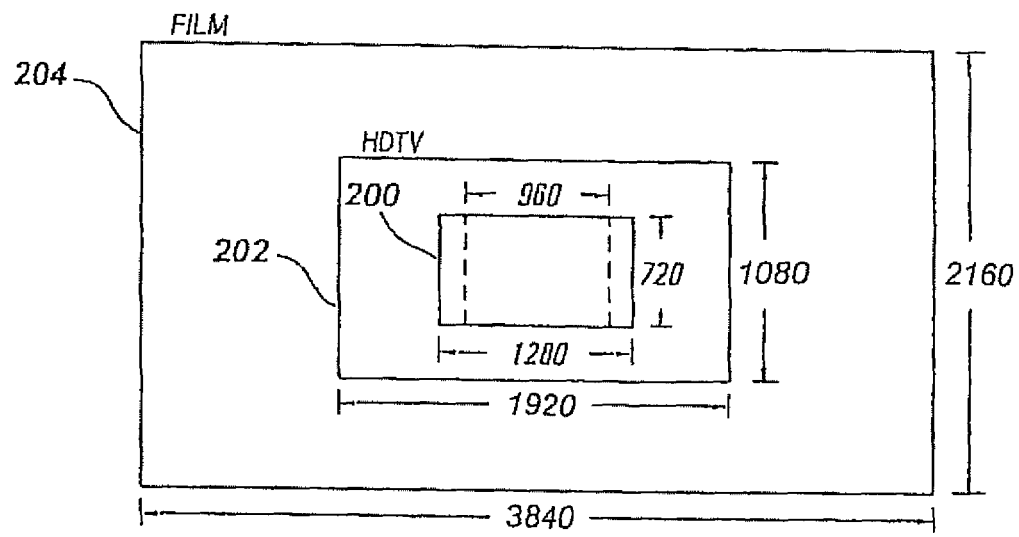

Another aspect of the invention is depicted in FIG. 1C. In this alternative, the system would follow the image dimensions suggested in several proposed digital HDTV formats considered by the Advanced Television Study Committee of the Federal Communications Commission. The format adopted assumes a wide-screen image having dimensions of 1280×720 pixels. Using these image dimensions (but at 24 fps progressive), compatibility with the existing formats would be available, with NTSC and PAL images derived from this frame size by excluding 160 columns of pixels from each side of the image, thereby resulting in an image having a dimension in pixels of 960×720. This new image would then be re-scaled to produce images having pixel dimensions of 640×480 for NTSC, or 768×576 for PAL. The corresponding wide-screen formats would be 854×480 and 1024×576, respectively. Utilizing a 4:2:2 sampling scheme, the 1280×720 image will require 1.85 MB when sampled at a precision of 8-bits, and 2.3 MB when sampled at a precision of 10-bits. When these signals are data-compressed utilizing a compression ratio of 10:1 for recording, the two image sizes require data rates of 4.44 MB per second (35.5 megabits per second) or 5.55 MB per second (44.4 megabits per second).

In order to preserve the full 15 MHZ bandwidth of this high-resolution signal, a sampling frequency of approximately 30 MHZ is required for encoding, which results in 1650 samples per total line, with 750 total lines per frame for a 1280×720 image at 24 frames-per-second. In contrast, typical high definition systems require sampling rates of 74 MHZ to provide a bandwidth of 30 MHZ). In this case, an image having a dimension in pixels of 1280×720 would contain 0.87890625 Mpxl, with 720 TV lines of resolution. Furthermore, the systems under evaluation by the ATSC of the FCC all assume a decimation of the two chrominance signals, with detail of only 640×360 pixels retained. Overall, the data rate for this system, utilizing 4:2:2 sampling with 10-bit precision, is less than 50 megabits per second. This is within the capabilities of currently available video recording equipment, such as Betacam SX, the DVCPRO50 or Digital S50. Because expensive, high data-rate recorders (such as the Toshiba D-6 format, the HDCAM, and D-5 format), are not required for applications utilizing the instant invention, the cost of the equipment and production systems for these applications is drastically reduced. The development path to 24 fps progressive is both well-defined and practical, as is the use of the previously described methods to produce images having a dimension in pixels of 1920×1080.

Figure 1D:
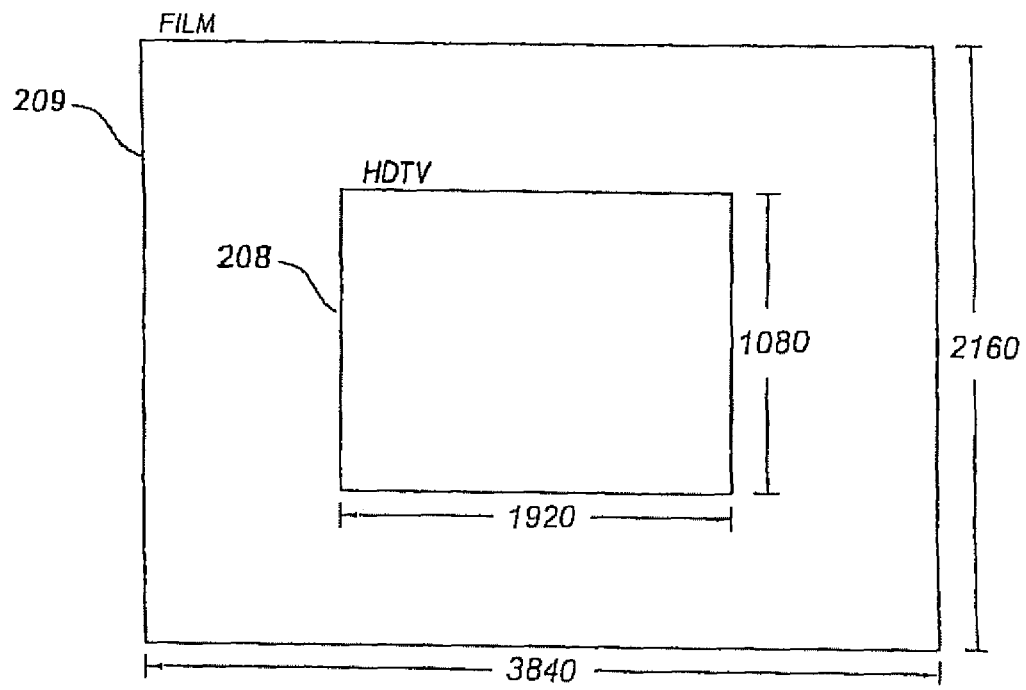

A third embodiment of the invention is depicted in FIG. 1D. In this alternative, the system would follow the image dimensions suggested in several proposed digital HDTV formats considered by the Advanced Television Study Committee of the Federal Communications Commission. The format adopted assumes a wide-screen image having dimensions of 1920×1080 pixels (2.1 megapixels), but at 24 frames-per-second Progressive. Utilizing a 4:2:2 sampling scheme, this 1920×1080 image will require 4.2 MB when sampled at a precision of 8-bits, and 5.2 MB when sampled at a precision of 10-bits. When these signals are data-compressed utilizing a compression ratio of 10:1 for recording, the two image sizes require data rates of 10 MB per second (80 Megabits per second) or 12.5 MB per second (96 megabits per second). In order to preserve the full bandwidth of this high-resolution signal, a sampling frequency of 74.25 MHZ is required for encoding, which results in 2750 samples per total line, with 1125 total lines per frame. In this case, an image having these dimensions would have over 1,200 TV lines of resolution per picture height, representing over 30 MHZ luminance bandwidth. The chrominance bandwidth (as R-Y/B-Y) would be 15 MHZ. In contrast, HDTV with 1920×1080 and 30 fps Interlace only produces 1,000 TV lines (200 lines less than above) of resolution per picture height from same sampling frequency of 74.25 MHZ.

Overall, the data rate for this system, utilizing 4:2:2 sampling with 10-bit precision, is less than 100 Megabits per second. This is within the capabilities of video recording equipment, such as the Panasonic DVCPRO100 or JVC Digital S100, which will be available in the near future. Because expensive, high data-rate recorders (such as the Toshiba D-6 format, the HDCAM, and D-5 format), are not required for applications utilizing the instant invention, the cost of the equipment and production systems for these applications is drastically reduced. These images may be resized into frames as large as 7680×4320, which would allow use of the system for special optical effects, or with other, specialized film formats, such as IMAX and those employing 65 mm. Camera negatives. In addition, conversions processes are available, as described herein below, to produce other HDTV formats (such as 1280×720 Progressive at 24 fps, 1920×1080 Interlaced at 25 fps, 1920×1080 Progressive at 50 fps, 1920×1080 Interlaced at 30 fps, and 1920×1080 Progressive at 60 fps), or to alternative SDTV formats, (such as 1024×576 at 25 fps, 768×576 at 25 fps, 853×480 at 30 fps, or 640×480 at 30 fps).

In each of the cases described herein above, a positioning or image centering signal may be included within the data stream, so as to allow the inclusion of information which may be utilized by the receiving unit or display monitor to perform a "pan/scan" operation, and thereby to optimize the display of a signal having a different aspect ratio than that of the display unit. For example, a program transmitted in a wide-screen format would include information indicating the changing position of the image center, so that a conventional (4:3 aspect ratio) display unit would automatically pan (horizontally and/or vertically) to the proper location. For the display of the credits or special panoramic views, the monitor optionally could be switched to a full "letter-box" display, or the image could be centered and resealed to include information corresponding to an intermediate situation, such as halfway between full-height (with cropped sides) and letter-box (full-width, but with blank spaces above and below the image on the display). This positioning/resealing information would be determined under operator control (as is typical for pan/scan operations when performing film transfers to video) so as to maintain the artistic values of the original material, within the limitations of the intended display format.

Conventional CCD-element cameras produce images of over 900 TV Lines horizontal Luminance (Y) resolution, with a sensitivity of 2,000 lux at f-11, and with a signal-to-noise ratio of 65 dB. However, typical HDTV cameras, at 1,000 TV Lines resolution and with sensitivity ratings of f-8, produce an image with only a 54 dB signal-to-noise ratio, due to the constraints of the wideband analog amplifiers and the smaller physical size of the CCD-pixel-elements. By employing the more conventional CCD-elements in the camera systems of this invention, and by relying upon the computer to create the HDTV-type image by image re-sizing, the improved signal-to-noise ratio is retained. In the practical implementation of cameras conforming to this new design approach, there will be less of a need for extensive lighting provisions, which in turn, means less demand upon the power generators in remote productions, and for AC-power in studio applications.

In CCD-based cameras, it is also a common technique to increase the apparent resolution by mounting the red and blue CCD-elements in registration, but offsetting the green CCD-element by one-half pixel width horizontally and in some application vertically. In this case, picture information is in-phase, but spurious information due to aliasing is out-of-phase. When the three color signals are mixed, the picture information is intact, but most of the alias information will be canceled out. This technique will evidently be less effective when objects are of solid colors, so it is still the usual practice to include low-pass optical filters mounted on each CCD-element to suppress the alias information. In addition, this technique cannot be applied to computer-based graphics, in which the pixel images for each color are always in registration. However, for Y/R-Y/B-Y video, the result of the application of this spatial-shift offset is to raise the apparent Luminance (Y) horizontal resolution to approximately 900 television lines (a 4:3 aspect ratio utilizing 12200 active pixels per line), and the apparent vertical resolution is increased by 50-100+ lines.

During the transition period to implement 24 fps recording as a new production standard, conventional 16:9 widescreen-capable CCD cameras (running in 25 or 30 fps Interlaced mode) may be utilized to implement the wideband recording method so as to preserve the inherent wideband capability of these cameras, in accordance with the invention. By abandoning the requirement for square pixels, sampling frequencies of up to 30 MHZ for luminance (15 MHZ for chrominance) preferably are utilized, which frequencies are less than half the typical sampling rate of 74 MHZ utilized for typical HDTV luminance signals in alternative systems. Chrominance components preferably are sampled consistent with a 4:2:2 system. This wideband data stream is then compressed 10:1, utilizing MPEG2 4:2:2 P@ML at 10-bit. The resultant data rate is still less than 50 Megabits per second. With a straightforward modification to increase the data compression rate to 10:1, this signal may be recorded utilizing any of several conventional recording devices, including Panasonic DVCPRO50, JVC Digital-S, and Sony Betacam SX, thereby preserving the wideband signal (up to 800 TV lines of resolution per picture height). By utilizing the appropriate techniques for image resizing and frame rate conversion as described herein, video systems may be supported consistent with 1280×720 60 fps progressive, 1280×720 24 fps Progressive, 1920×1080 25 fps Interlace, 1920×1080 30 fps Interlace, 1920×1080 50 fps progressive, 1920×1080 60 fps progressive, in accordance with the invention.

The availability of hard-disk drives of progressively higher capacity and data transmission rates is allowing successively longer program duration and higher resolution image displays in real-time. At the previously cited data rates, widescreen frames (1024×576 pixel, 24 fps, 4:2:2 process, 8 bits precision and 5:1 compression) would require 330 MB/min, so that currently available 10 GB disk drives will store more than 30 minutes of video. When the anticipated 50 GB disk drives (5.25-inch disks) become available from Seagate within the year, these units will store 150 minutes, or 2½ hours of video. For this application, a data storage unit is provided to facilitate editing and production activities, and it is anticipated that these units would be employed in much the same way as video cassettes are currently used in Betacam SP and other electronic news gathering (ENG) cameras and in video productions. This data storage unit may be implemented by use of a magnetic, optical (such as DVD-R or DVD-RAM) discs, or magneto-optical disk drive with removable storage media, by a removable disk-drive unit, such as those based on the PCMCIA standards, by tape-based storage means, or by semiconductor-based memory. Future advances, in storage technology will lead to longer duration program data storage. Alternatively, this storage capacity could be applied to lower ratios of data compression, higher sampling precision (10 bits or more) or higher-pixel-count images, within the limits of the same size media.

Figure 2:
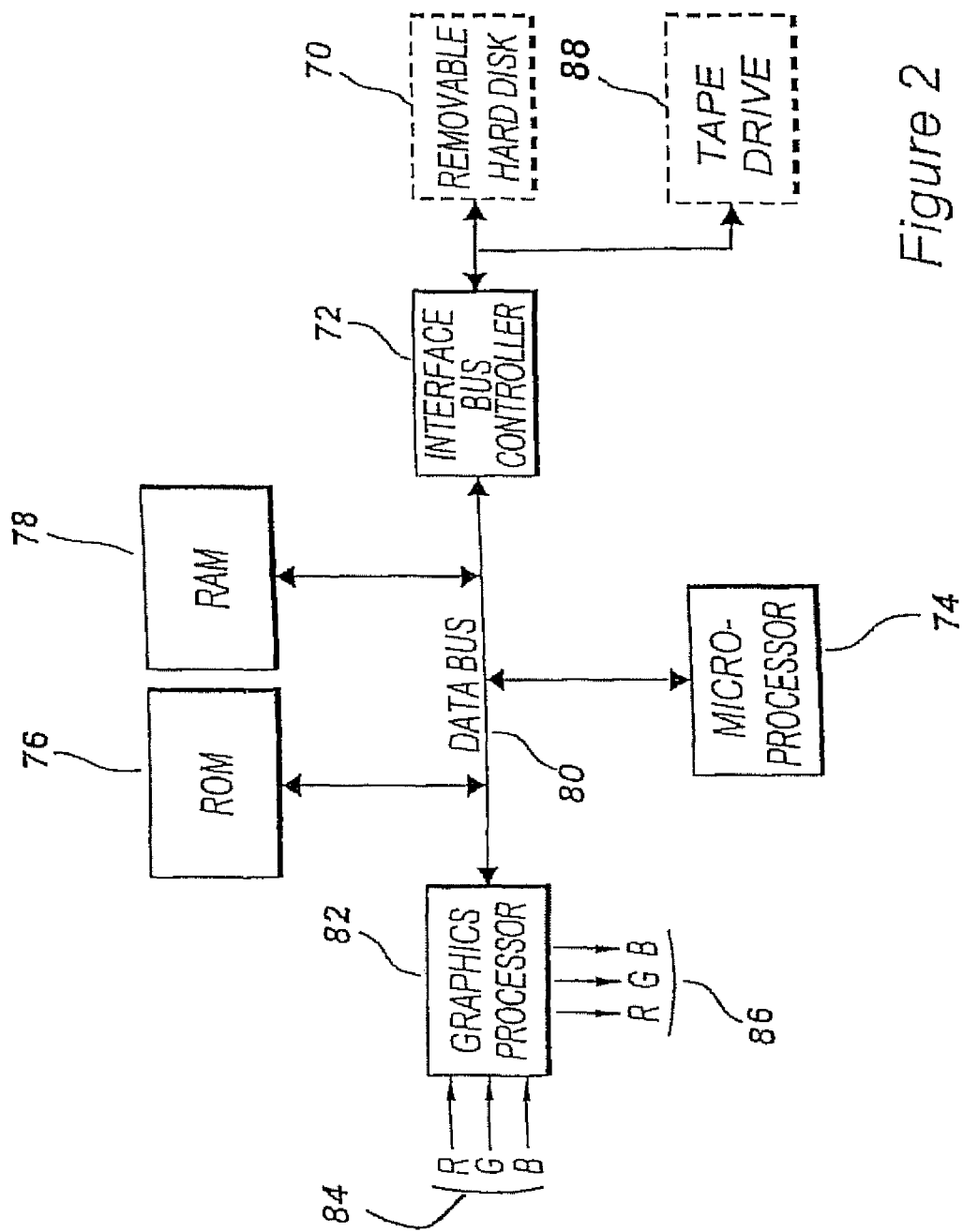
FIG. 2 shows a functional diagram for disk/tape-based video recording.

FIG. 2 shows the functional diagram for the storage-device-based digital recorder employed in the video camera, or separately in editing and production facilities. As shown, a removable hard disk drive 70 is interfaced through a bus controller 72. In practice, alternative methods of storage such as optical drives (such as DVD-R or DVD-RAM units) or magneto-optical drives could be used, based on various interface bus standards such as SCSI-2. This disk drive system currently achieves data transfer rates of 40 MB/sec, and higher rates on these or other data storage devices, such as high-capacity removable memory modules, is anticipated. If a digital tape-based format is selected, a tape drive 88 is interfaced through the bus controller 72. Currently available digital tape-based formats include DVCPRO, DVCPRO50, DVCAM, Betacam SX, Digital 550, and others. These units typically offer storage capacities in the range of 30 to 50 GigaBytes. The microprocessor 74 controls the 64-bit or wider data bus 80, which integrates the various components. Currently available microprocessors include the Alpha 21164 by Digital Equipment Corporation, or the MIPS processor family by MIPS Technologies, Inc. Future implementations would rely on the Pentium™ series by Intel Corp. or the PowerPC G3, which is capable of sustained data transfer rates of 100 MB/sec.

Up to 256 MB of ROM, shown at 76, is anticipated for operation, as is 256 MB or more of RAM, shown at 78. Current PC-based video production systems are equipped with at least 64 MB of RAM, to allow sophisticated editing effects. The graphics processor 82 represents dedicated hardware that performs the various manipulations required to process the input video signals 84 and the output video signals 86. Although shown using an RGB format, either the inputs or outputs could be configured in alternative signal formats, such as Y/R-Y/B-Y, YIQ, YUV or other commonly used alternatives. In particular, while a software-based implementation of the processor 82 is possible, a hardware based implementation is preferred, with the system employing a compression ratio of 5:1 for the conventional/widescreen signals ("NTSC/PAL/Widescreen"), and a 10:1 compression ratio for HDTV signals (1280×720 or 1920×1080, as described herein above). Example of the many available options for this data compression include the currently available Motion-JPEG system and the MPEG systems. Image re-sizing alternatively may be performed by dedicated microprocessors, such as the gm865X1 or gm833X3 by Genesis Microchip, Inc. Audio signals may be included within the data stream, as proposed in the several systems for digital television transmission considered by the Federal Communications Commission, or by one of the methods available for integrating audio and video signals used in multi-media recording schemes, such as the Microsoft "AVI" (Audio/Video Interleave) file format. As an alternative, an independent system for recording audio signals may be implemented, either by employing separate digital recording provisions controlled by the same system and electronics, or by implementing completely separate equipment external to the camera system described herein above.

Figure 3:
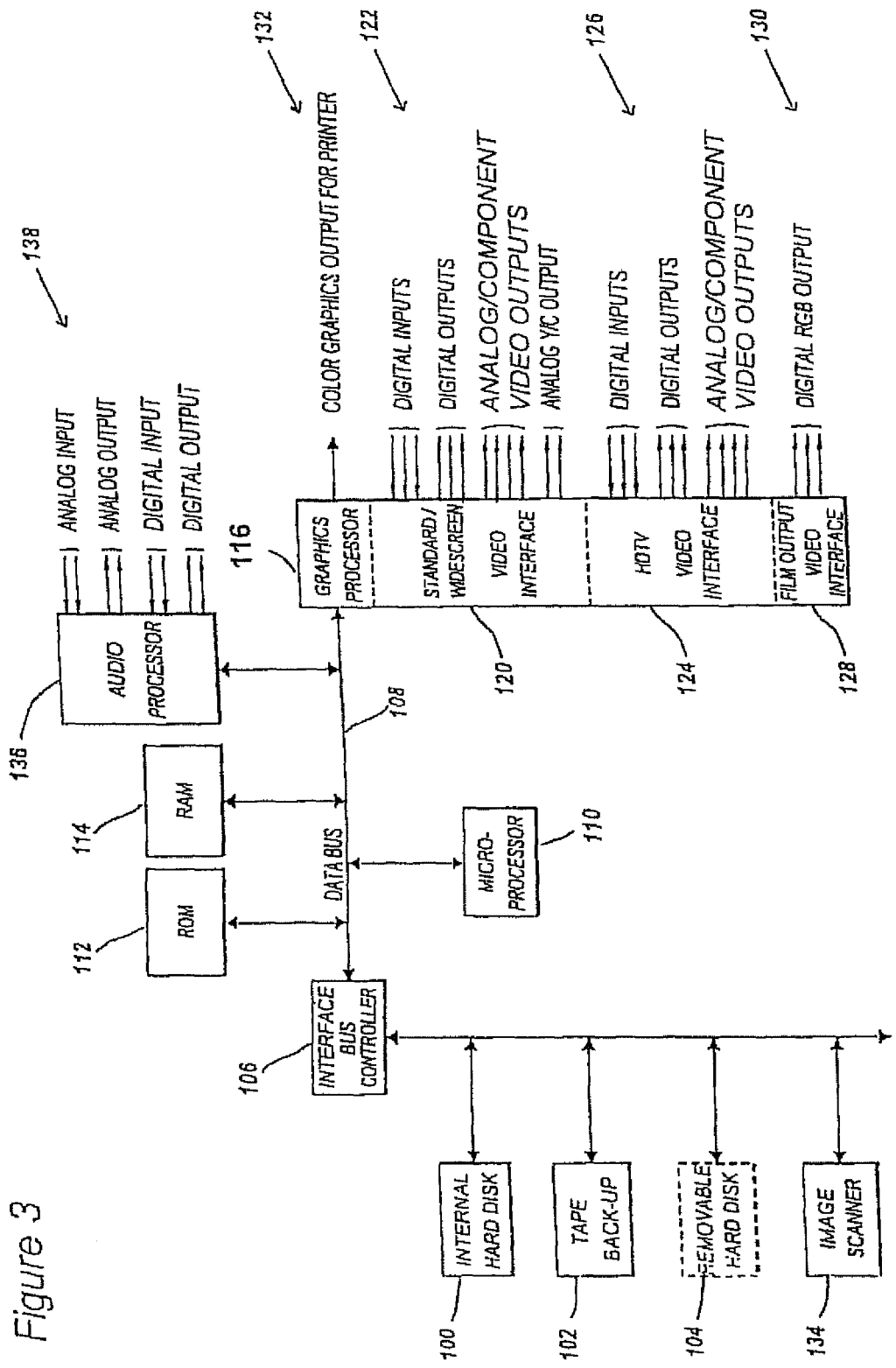
FIG. 3 shows the components comprising the multi-format audio/video production system.

FIG. 3 shows the components that comprise a multi-format audio/video production system according to the invention. As in the case of the computer disk- or tape-based recording system of FIG. 2, an interface bus controller 106 provides access to a variety of storage devices, preferably including an internal hard-disk drive 100, a tape-drive 102, and a hard-disk drive with removable media or a removable hard-disk drive 104. Other possible forms of high-capacity data storage (not shown) utilizing optical, magneto-optical, or magnetic storage techniques may be included, as appropriate for the particular application. The interface bus standards implemented could include, among others, SCSI-2. Data is transmitted to and from these devices under control of microprocessor 110. Currently, data bus 108 would operate as shown as 64-bits wide, employing microprocessors such as those suggested for the computer-disk-based video recorder of FIG. 3. As higher-powered microprocessors become available, such as the PowerPC G3, the data bus may be widened to accommodate 128 bits, and the use of multiple parallel processors may be employed, with the anticipated goal of 1,000 MIPS per processor. Up to 256 MB of ROM 112 is anticipated to support the requisite software, and at least 1,024 MB of RAM 114 will allow-for the sophisticated image manipulations, inter-frame interpolation, and intra-frame interpolation necessary for sophisticated production effects, and for conversions between the various image formats.

A key aspect of the system is the versatility of the graphics processor shown generally as 116. Eventually, dedicated hardware will allow the best performance for such operations as image manipulations and re-scaling, but it is not a requirement of the system that it assume these functions, or even that all of these functions be included in the graphics processor in every configuration of the system. Three separate sections are employed to process the three classifications of signals. Although the video input and output signals described herein below are shown, by example, as RGB, any alternative format for video signals, such as Y/R-Y/B-Y, YIQ, YUV, or other alternatives may be employed as part of the preferred embodiment. One possible physical implementation would be to create a separate circuit board for each of the sections as described below, and manufacture these boards so as to be compatible with existing or future PC-based electrical and physical interconnect standards.

A standard/widescreen video interface 120, intended to operate within the 1024×576, 1280×720, 1024×768, 854× 480, 640×480 or 1280×960 image sizes, accepts digital RGB or Y/R-Y/B-Y signals for processing and produces digital RGB or Y/R-Y/B-Y outputs in these formats, as shown generally at 122. Conventional internal circuitry comprising D/A converters and associated analog amplifiers are employed to convert the internal images to a second set of outputs, including analog RGB or Y/R-Y/B-Y signals and composite video signals. These outputs may optionally be supplied to either a conventional multi-scan computer video monitor or a conventional video monitor having input provisions for RGB or Y/R-Y/B-Y signals (not shown). A third set of outputs supplies analog Y/C video signals. The graphics processor may be configured to accept or output these signals in the standard NTSC, PAL, or SECAM formats, and may additionally be utilized in other formats as employed in medical imaging or other specialized applications, or for any desired format for computer graphics applications. Conversion of these 24 frame-per-second progressive images to the 30 fps Interlaced (actually, 29.97 fps) NTSC and 25 fps PAL formats may be performed in a similar manner to that used for scanned film materials, that is, to NTSC by using the conventional 3:2 "pull-down" field-sequence, or to PAL by reproducing the images at the higher 25 fps rate.

If the source signal is 24 fps interlaced, these images first are de-interlaced to 48 fps progressive, which can be performed by dedicated microprocessors such as the gmVLD8 or gmVLD10 by Genesis Microchips, and then converted to 60 fps progressive by utilizing a "Fourth Frame Repeat" process (which repeats the fourth frame in every sequence). Next, the signal is interlaced to produced 60 fps interlaced, and half of the fields are discarded to produce 30 fps interlaced (as disclosed in FIG. 7F). If the source format is 25 fps interlaced video (as would result from using conventional PAL-type equipment, or PAL-type equipment as modified in accordance with the invention), the first step is to slow down the frame rate by replaying the signal at 24 fps Interlaced. Next, the signal is de-interlaced to 48 fps progressive (as described herein above), and the Fourth Frame Repeat process is utilized to convert the-signal to 60 fps progressive. In the last step, the signal is interlaced to produced 60 fps interlaced, and half of the fields are discarded to produce 30 fps interlaced. Alternatively, if the source signal is 24 fps progressive, the 60 fps progressive signal may be produced directly from a "3:2 Frame Repeat" process shown in FIG. 7G (which is analogous to the conventional "3:2 pull-down" field-sequencing process previously described). For other HDTV frame rates, aspect ratios, and line rates, intra-frame and inter-frame interpolation and image conversions may be performed by employing comparable techniques well known in the art of computer graphics and television.

An HDTV video interface 124, intended to operate within the 1920×1080 or other larger image sizes (with re-sizing as necessary), accepts digital RGB or Y/R-Y/B-Y (or alternative) signals for processing and produces, digital outputs in the same image format, as shown generally at 126. As is the case for the standard/widescreen interface 120, conventional internal circuitry comprising D/A converters and associated analog amplifiers are employed to convert the internal images to a second set of outputs, for analog RGB signals and composite video signals. In alternative embodiments, this function may be performed by an external upconvertor, which will process the wideband signal of the instant invention. A modification of currently available upconvertors is required, to increase the frequency of the sampling clock in order to preserve the full bandwidth of this signal, in accordance with the invention. In this case, frequency of the sampling clock is preferably adjustable to utilize one of several available frequencies.

The third section of the graphics processor 116 shown in FIG. 3 is the film output video interface 128, which comprises a special set of video outputs 130 intended for use with devices such as laser film recorders. These outputs are preferably configured to provide a 3840×2160 or other larger image size from the image sizes employed internally, using re-sizing techniques discussed herein as necessary for the format conversions. Although 24 fps is the standard frame rate for film, some productions employ 30 fps (especially when used with NTSC materials) or 25 fps (especially when used with PAL materials), and these alternative frame rates, as well as alternative image sizes and aspect ratios for internal and output formats, are anticipated as suitable applications of the invention, with "3:2-pull-down" utilized to convert the internal 24 fps program materials to 30 fps, and 25 fps occurring automatically as the film projector runs the 24 fps films at the 25 fps rate utilized for PAL-type materials.

Several additional optional features of this system are disclosed in FIG. 3. The graphics processor preferably also includes a special output 132 for use with a color printer. In order to produce the highest quality prints from the screen display it is necessary to adjust the print resolution to match the image resolution, and this is automatically optimized by the graphics processor for the various image sizes produced by the system. In addition, provisions may be included for an image scanner 134, which may be implemented as a still image scanner or a film scanner, thereby enabling optical images to be integrated into the system. An optional audio processor 136 includes provisions for accepting audio signals in either analog or digital form, and outputting signals in either analog or digital form, as shown in the area generally designated as 138. For materials including audio intermixed with the video signals as described herein above, these signals are routed to the audio processor for editing effects and to provide an interface to other equipment.

It is important to note that although FIG. 3 shows only one set of each type of signal inputs, the system is capable of handling signals simultaneously from a plurality of sources and in a variety of formats. Depending on the performance level desired and the image sizes and frame rates of the signals, the system may be implemented with multiple hard disk or other mass-storage units and bus controllers, and multiple graphics processors, thereby allowing integration of any combination of live camera signals, prerecorded materials, and scanned images. Improved data compression schemes and advances in hardware speed will allow progressively higher frame rates and image sizes to be manipulated in real-time.

Simple playback of signals to produce PAL output is not a serious problem, since any stored video images may be replayed at any frame rate desired, and filmed material displayed at 25 fps is not objectionable. Indeed, this is the standard method for performing film-to-tape transfers used in PAL- and SECAM-television countries. Simultaneous output of both NTSC and film-rate images may be performed by exploiting the 3:2 field-interleaving approach: 5×24=120=2× 60. That is, two film frames are spread over five video fields. This makes it possible to concurrently produce film images at 24 fps and video images at 30 fps. The difference between 30 fps and the exact 29.97 fps rate of NTSC may be palliated by slightly modifying the system frame rate to 23.976 fps. This is not noticeable in normal film projection, and is an acceptable deviation from the normal film rate.

Figure 4:
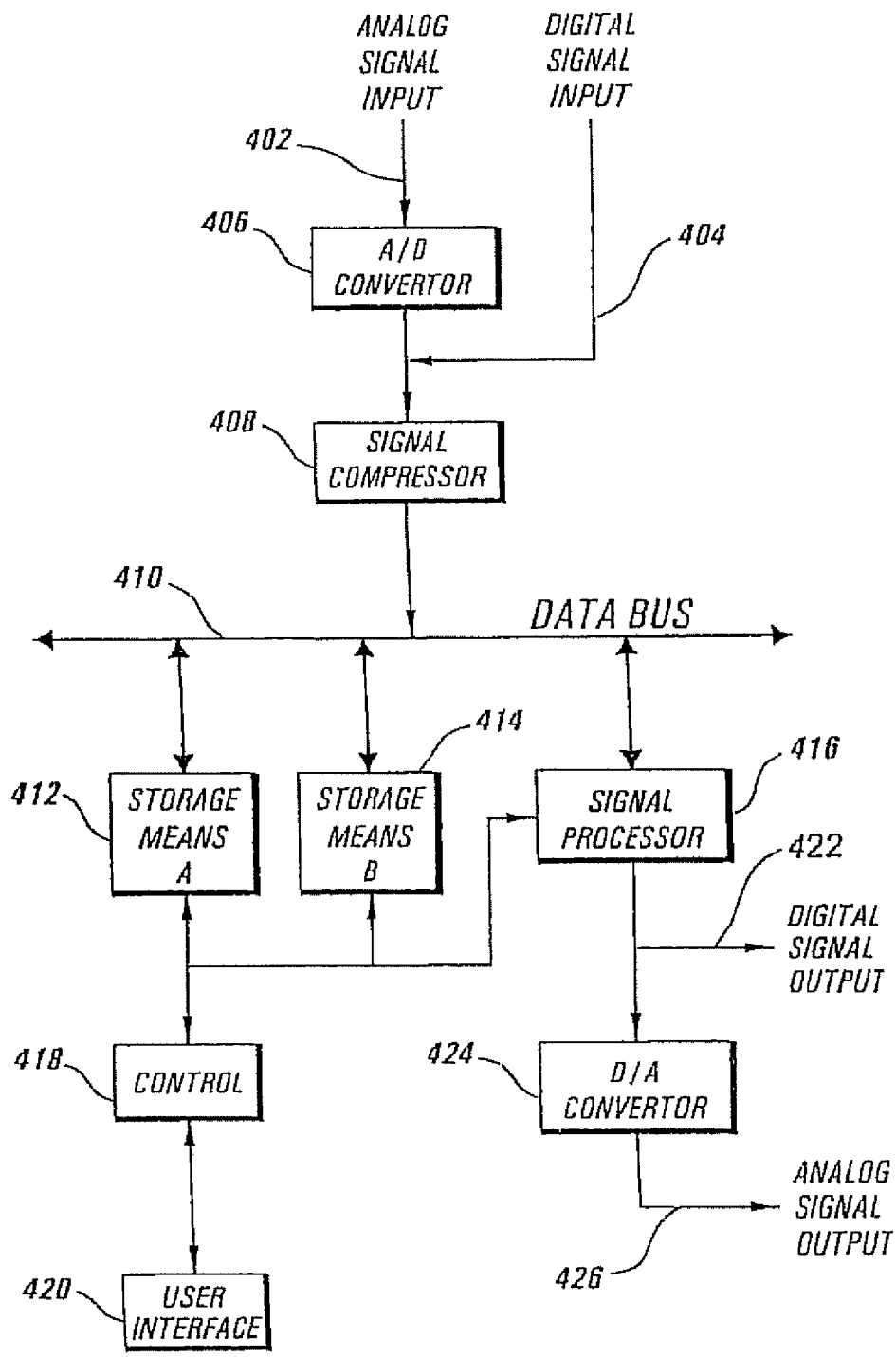
FIG. 4 is a block diagram of an alternative embodiment of video program storage means incorporating asynchronous reading and writing capabilities to carry out frame-rate conversions.

The management of 25 fps (PAL-type) output signals in a signal distribution system configured for 24 fps production applications (or vice versa) presents technical issues which must be addressed, however. One alternative for facilitating these and other frame-rate conversions is explained with reference to FIG. 4. A digital program signal 404 is provided to a signal compression circuit 408. If the input program signal is provided in analog form 402, then it is first processed by A/D converter 406 to be placed in digital form. The signal compressor 408 processes the input program signal so as to reduce the effective data rate, utilizing any of the commonly implemented data compression schemes, such as motion-JPEG, MPEG1, MPEG2, etc. well known in the art. As an alternative, the digital program signal 404 may be provided in data-compressed form. At this point, the digital program signal is provided to data bus 410. By way of example, several high-capacity digital storage units, designated as "storage means A" 412 and "storage means B" 414, are included for storing the digital program signals presented on data bus 410, under management by controller 418.

The two storage means 412 and 414 may be used in alternating fashion, with one storing the source signal until it reaches its full capacity. At this point, the other storage means would continue storing the program signal until it, too, reached its full capacity. The maximum program storage capacity for the program signals will be determined by various factors, such as the input program signal frame rate, the frame dimensions in pixels, the data compression rate, the total number and capacities of the various storage means, and so forth. When the available storage capacity has been filled, this data storage scheme automatically will result in previously-recorded signals being overwritten. As additional storage means are added, the capacity for time-delay and frame rate conversion is increased, and there is no requirement that all storage means be of the same type, or of the same capacity. In practice, the storage means would be implemented using any of the commonly available storage techniques, including, for example, magnetic disks, optical (such as DVD-RAM discs) or magneto-optical discs, or semiconductor memory.

When it is desired to begin playback of the program signal, signal processor 416, under management by controller 418 and through user interface 420, retrieves the stored program signals from the various storage means provided, and performs any signal conversions required. For example, if the input program signals were provided at a 25 fps rate (corresponding to a 625-line broadcast system), the signal processor would perform image resizing and inter-frame interpolation to convert the-signal to 30 fps (corresponding to a 525-line broadcast system). Other conversions (such as color encoding system conversion from PAL-format to NTSC, etc., or frame dimension or aspect-ratio conversion) will be performed as necessary. The output of the signal processor is then available in digital form as 422, or may be processed further, into analog form 426 by D/A converter 424. In practice, a separate data bus (not shown) may be provided for output signals, and/or the storage means may be implemented by way of dual-access technology, such as dual-port RAM utilized for video-display applications, or multiple-head-access disk or disk storage units, which may be configured to provide simultaneous random-access read and write capabilities. Where single-head storage means are implemented, suitable input buffer and output buffer provisions are included, to allow time for physical repositioning of the record/play head.

In utilizing program storage means including synchronous recording and playback capabilities of the types just described, if it is known that a program will be stored in its entirety before the commencement of playback, that is, with no time-overlap existing between the occurrence of the input and output signal streams, it typically will be most efficient to perform any desired frame conversion on the program either before or after initial storage, depending upon which stored format would result in the least amount of required memory. For example, if the program is input at a rate of 24 frames per second, it probably will be most efficient to receive such a program and store it at that rate, and perform a conversion to higher frame rates upon output. In addition, in situations where a program is recorded in its entirety prior to conversion into a particular output format, it is most efficient to store the program either on a tape-based format or a format such as the new high-capacity DVD-type discs, given the reduced cost, on a per-bit basis, of these types of storage. Of course, conventional high-capacity disk storage also may be used, and may become more practical as storage capacities continue to increase and costs decrease. If it is known that a program is to be output at a different frame rate while it is being input or stored, it is most preferable to use disk storage and to perform the frame rate conversion on an ongoing basis, using one of the techniques described above. In this case, the high-capacity video storage means, in effect, assumes the role of a large video buffer providing the fastest practical access time. Again, other memory means (types) may be used, including all solid-state and semiconductor types, depending upon economic considerations, and so forth.

As an example of an alternative embodiment, the storage means 100 or 104 are equipped with dual-head playback facilities and a second set of graphics processing hardware (not shown) analogous in function to the normal graphics processing hardware (identical to the standard hardware shown as 120, 124, and 128), and having analogous signal output facilities (identical to the standard provisions shown as 122, 126, 130, and 132). In this case, the two heads would be driven independently, to provide simultaneous, asynchronous playback at different frame rates. That is, one head would be manipulated so as to provide a data stream corresponding to a first frame rate (for example, 25 fps), while the second head would be manipulated so as to provide a data stream corresponding to a second frame rate (for example, 24 fps, which, in turn, may be converted to 30 fps, using the "3:2-pull-down" technique). In this case, both the storage means and also the internal bus structure of the system would have to support the significantly increased data rate for providing both signal streams simultaneously, or, as an alternative, a second, separate data bus would be provided.

In some applications, a more sophisticated conversion scheme is required. For example, in frame rate conversion systems of conventional design, if an input program signal having a 24 fps rate format is to be displayed at a 25 fps rate, it is customary to simply speed up the source signal playback, so as to provide the signals at a 25 fps rate. This is the procedure utilized for performing a conversion of 24-fps-film-material for 25 fps PAL-format video usage. However, implementation of this method requires that the user of the output signal must have control over the source-signal playback. In a wide-area distribution system (such as direct-broadcast-satellite distribution) this is not possible. While a source signal distributed at 24 fps readily could be converted to 30 fps (utilizing the familiar "3-2-pull-down" technique), the conversion to 25 fps is not as easily performed, due to the complexity and expense of processing circuitry required for inter-frame interpolation over a 24-frame sequence. However, utilizing the system disclosed in FIG. 4, the conversion is straightforward. If, for example, a 24 fps program lasting 120 minutes is transmitted in this format, there are a total of 172,800 frames of information (24 frames/second×60 seconds/minute×120 minutes). Display of this program in speeded-up fashion at 25 fps would mean that the input frame rate falls behind the output frame rate by one frame per second, or a total of 7,200 frames during the course of the program. At a 24 fps transmission rate, this corresponds to 300 seconds transmission time. In other words, for the input program (at 24 fps) and the output program (at 25 fps) to end together, the input process would have to commence 300 seconds before the output process begins. In order to perform this process, then, it is necessary for the storage means to have the capacity to retain 300 seconds of program material, in effect serving as a signal buffer. As an example, for the systems disclosed herein in which the compressed-data rates range from 5.5 MB/sec (for 24 fps standard/widescreen Y/R-Y/B-Y-based TV formats, using 5:1 data compression such as MPEG or motion-JPEG and 4:2:2 processing with 8-bit precision) to 10 MB/sec (for 24 fps HDTV Y/R-Y/B-Y-based formats, using 10:1 data compression such as MPEG or motion-JPEG and 4:2:2 processing with 8-bit precision), it may be necessary to store as much as 3.3 GBytes of data, which is readily available by way of multiple disks or discs utilizing conventional storage technology. In practice, the transmission simply would begin 300 seconds before the playback begins, and once the playback starts, the amount of buffered signal would decrease by one frame per second of playback until the last signal is passed through as soon as it is received.

A mirror of this situation arises in the case of a 25 fps signal to be displayed at 24 fps, or some other data rate readily provided by conversion from 24 fps (such as 30 fps). In this case, the source signal is provided at a higher frame rate than the output signal, so that a viewer watching a program from the onset of the transmission would fall behind the source signal rate, and the storage means would be required to hold frames of the program to be displayed at a time after the source signal arrival time. In the case of the 120 minute program described above, the viewing of the source program would conclude 300 seconds after the source signal itself had concluded, and comparable calculations are applied for the storage means. In this case, the extra frames would be accumulated as the buffer contents increased, until, after the transmission has completed, the last 300 seconds would be replayed directly from the storage means.

The conversion of frame rates from 30 fps to 24 fps or to 25 fps is more complicated, because some form of inter-frame interpolation is required. In one case, a multi-frame storage facility would allow this type of interpolation to be performed in a relatively conventional manner, as typically is utilized in NTSC-to-PAL conversions (30 fps to 25 fps). At this point, a 25 fps to 24 fps conversion could be performed, in accordance with the methods and apparatus described herein above.

It should be noted that if, for example, a DVD-R-type, DVD-RAM-type, or some form of removable magnetic storage media is selected, then the implementation of the significantly higher data compression rates of MPEG-2 coding techniques will result in the ability to record an entire program of 120 minutes or more in duration. In this manner, the complete program is held in the disk/buffer, thereby enabling the user to perform true time-shifting of the program, or allowing the program rights owner to accomplish one form of software distribution, in accordance with the invention.

An alternative method to carry out this frame rate conversion is carried out utilizing the following process. The 30 fps interlaced signal is first de-interlaced to 60 fps Progressive. Then, every fifth frame is deleted from the sequence, producing a 48 fps progressive signal stream. Next, these remaining frames are converted to 24 fps interlaced, as disclosed in FIG. 7I ("$5^{th}$ Frame Reduction"). If the original source material were from 24 fps (for example, film), then if the repeated fields (i.e., the "3" field of the 3:2 sequence) were identified at the time of conversion, then the removal of these fields would simply return the material to its original form. If the desired conversion is to be from 30 fps to 25 fps, then an equivalent procedure would be performed using the storage-based frame-conversion method described herein above. As an alternative, the 30 fps interlaced signal would first be de-interlaced to 60 fps progressive; then, every sixth frame would be deleted from the sequence ("$6^{th}$ Frame Reduction"). The remaining frames are re-interlaced to produce 25 fps interlaced, as disclosed in FIG. 7H. Depending on the original source material frame rate and intermediate conversions, the user would select the method likely to present the least amount of image impairment.

In the case in which the user is able to exercise control over the frame rate of the source program material, an alternative method is available. Just as film-to-video transfers for PAL-format (25 fps) presentations utilize a speeded-up playback of the 24 fps film materials to source them at the 25 fps Progressive rate (thereby matching the intended output frame rate), the reverse of this process enables a user to utilize materials originated at 25 fps Progressive to produce playback at 24 fps. As disclosed herein above, conversions of 24 fps progressive materials are handled easily by way of conventional methods (such as the "3:2-pull-down" method), and therefore the operator control of the source material enables the user to utilize materials originating from conventional or widescreen PAL format sources for editing and production, then replay the resulting program at 24 fps for conversion to either standard or widescreen NTSC output materials, or even to HDTV format materials, all at 30 fps Interlaced, by performing the "3:2-pull-down" process.

If the source format is 25 fps interlaced video (as would result from using conventional PAL-type CCD widescreen camera), an alternative method for producing a 30 fps Interlaced signal is available. Instead of performing a slow-down to produce a 24 fps interlaced signal, the 25 fps Interlaced signal is first de-interlaced to 50 fps progressive. Next, a "$4^{th}$ Frame Repeat" process is applied, which results in a 62.5 fps progressive signal. This signal is then converted to 62.5 fps interlaced, and after half of the fields are discarded, to produce 31.25 fps interlaced. After data compression, the signal undergoes a slow-down process, resulting in a 30 fps interlaced signal which now has a compressed-data-rate of less than 10 Mbytes per second, as disclosed in FIG. 7D. By using this procedure, the entire process from the CCD camera to the final conversion to 30 fps Interlaced only one data compression step is employed. Alternatively, if the output of the camera is already in data compressed form, then this signal must be decompressed before applying the listed conversion steps. In order to ensure accurate conversion, interlace and de-interlace processes should only be applied to de-compressed signals. Conversely, speed-up and slow-down procedures are preferably applied with compressed data, as the raw data rate for uncompressed video, depending on the image dimensions in pixels and frame rate, will be in the range of 30 to 100 MB per second, which is not practical for current technology storage devices.

A variety of conversions between formats (both interlaced and progressive) having differing frame rates, and some of these possible conversion paths are indicated in FIGS. 7A through 7I. While extensive, these listings are not intended to represent a complete listing of all alternatives, as in many cases there is more than one combination of methods which may affect an equivalent conversion. Depending on the particular application, different paths may be selected, and these differing paths may produce more, or less, effective results.

The various alternatives utilize several techniques not previously applied to these types of conversions. For example, conversions of 60 fps progressive signals to 30 fps Progressive may be effected by simply dropping alternate frames. On the other hand, a "3:2 Frame Repetition" method consists of repeating a first frame a second and a third time, then repeating the next frame a second time, thereby converting two frames into five frames (as depicted in FIG. 7G).

Depending on whether the source material is 24 fps progressive or 24 fps interlaced, different approaches are utilized for conversion to 30 fps interlaced. In the first case, the 24 fps progressive signal is first converted to 24 fps Interlaced. A set of four consecutive frames may be indicated as 1A1B, 2A2B, 3A3B, 4A4B. By recombining these fields (but outputting them at a 30 fps rate) the following field sequence is obtained: 1A1B, 1A2B, 2A3B, 3A4B, 4A4B. This sequence repeats for every four input frames, which is to say, for every five output frames (as depicted in FIG. 7C).

Alternatively, for a signal which originates at 24 fps Interlaced, the original four-frame sequence is identical. However, the situation is more complicated because the absolute time-sequence of frames must be preserved. For this reason, it is necessary to reverse the field identification of alternate groups of fields in order to preserve the proper interlace relationship between the fields. In effect, every fourth and seventh field in the eight-field (24 fps interlaced) sequence is repeated, but with reversed field identification (as disclosed in FIG. 7E). When the fourth input field has had its identification reversed (to produce the fifth output field), then the next two input fields (corresponding to the sixth and seventh output field) in the sequence also will require field reversal, in order to preserve the correct sequence for proper interlace. Furthermore, when the seventh input field is repeated, the first time it will appear in reversed-field-identity from as the eighth output field. For this procedure, the resulting field sequence will be 1A1B, 2A2B, 2B*3A*, 3B*4A*, 4A4B (wherein a field having reversed field identification is denoted by a * symbol). This sequence repeats for every four input frames, which is to say, for every five output frames.

In addition, the reversal of the field identity of the fourth input field (when repeated) results in information that previously was displayed on the second scan line now being displayed on the first scan line. Therefore, it is necessary to discard the first line of the next reversed-field, so that the information displayed on the second scan line of the new field will be the information previously displayed on the third line of the next (reversed) field. After the seventh input field has been reversed (to produce the eighth output field, the following fields are once again in the proper line order without any further adjustments of this kind (as disclosed in FIG. 7E).

For image manipulations entirely within the internal storage format, there is no issue as to interlacing, as the graphics processor is only manipulating a rectangular array of image pixels, not individual scan lines. As such, identification of fields is derived solely from the location of the image pixels on either odd-numbered lines or even-numbered lines. The interlacing field identification adjustments are made only at the time of output to the display device. In these applications, the presence of the storage means allows the viewer to control the presentation of a program, utilizing a user interface 420 to control the playback delay and other characteristics of the signal while it is being stored or thereafter. In practice, a wide range of alternatives for input frame rates and output frame rate conversions are made available through this system, by selecting the most appropriate of the various methods for altering the frame rate of a signal described herein.

Figure 5:
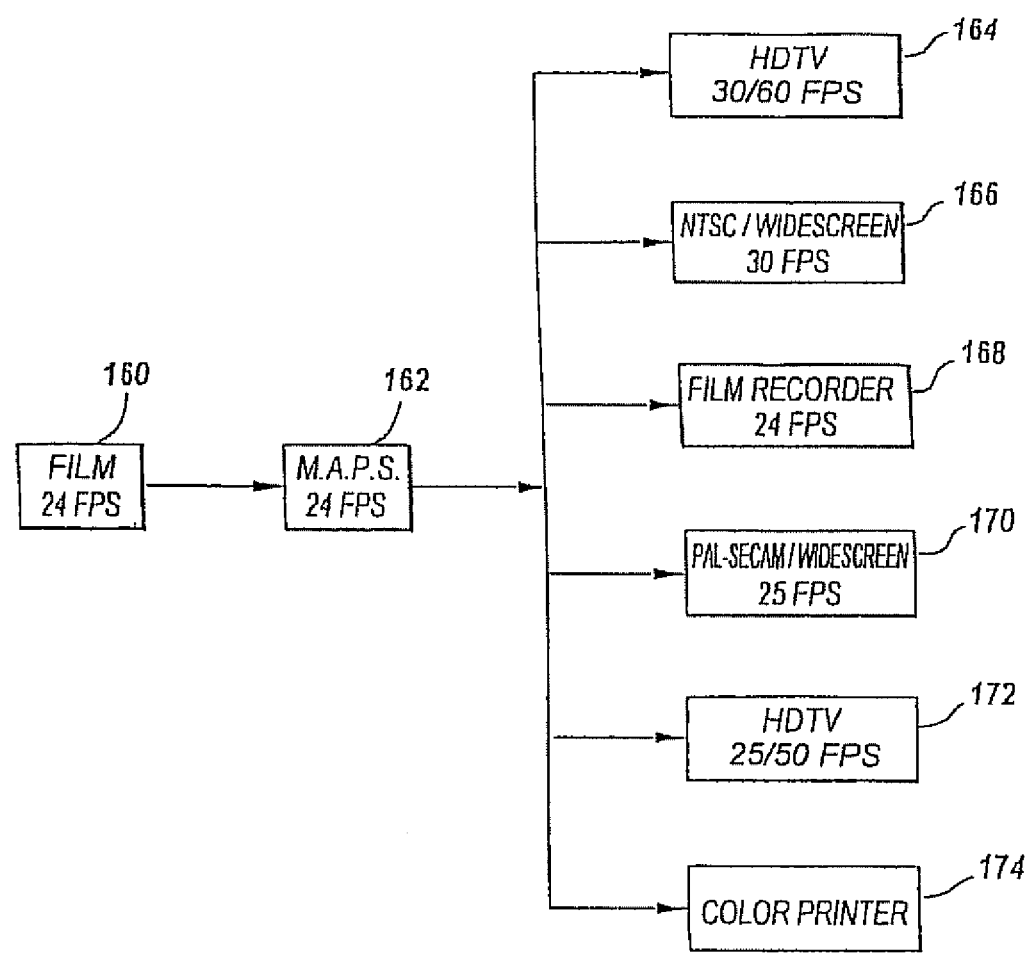
FIG. 5 shows the inter-relationship of the multi-format audio/video production system to many of the various existing and planned video formats.

FIG. 5 shows the inter-relationship of the various film and video formats compatible with the invention, though not intended to be inclusive of all possible implementations. In typical operations, the multi-format audio/video production system 162 would receive film-based elements 160 and combine them with locally produced materials already in the preferred internal format of 24 frames-per-second. In practice, materials may be converted from any other format including video at any frame rate or standard. After the production effects have been performed, the output signals may be configured for any use required, including, but not limited to, HDTV at 30/60 fps shown as 164, widescreen at 30 fps shown as 166, widescreen at 25 fps shown as 170, or HDTV at 25/50 fps shown as 172. In addition, output signals at 24 fps are available for use in a film-recording unit 168.

Figure 6:
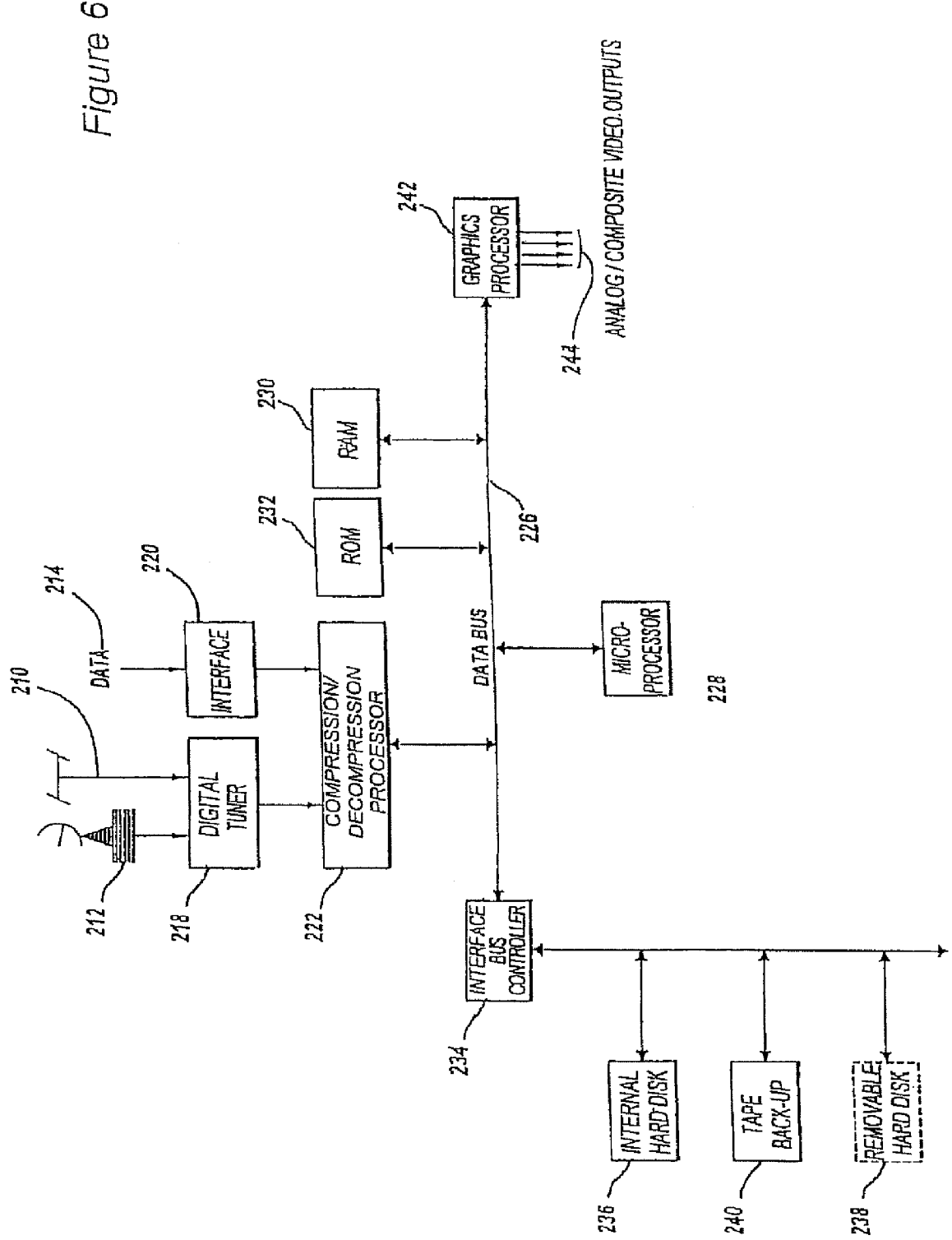
FIG. 6 shows the implementation of a complete television production system, including signals provided by broadcast sources, satellite receivers, and data-network interfaces.

In FIG. 6, signals are provided from any of several sources, including conventional broadcast signals 210, satellite receivers 212, and interfaces to a high bandwidth data network 214. These signals would be provided to the digital tuner 218 and an appropriate adapter unit 220 for access to a high-speed data network before being supplied to the decompression processor 222. As an option, additional provisions for data compression would provide for transmission of signals from the local system to the high bandwidth data network 214. The processor 222 provides any necessary data de-compression and signal conditioning for the various signal sources, and preferably is implemented as a plug-in circuit board for a general-purpose computer, though the digital tuner 218 and the adapter 220 optionally may be included as part of the existing hardware.

The output of processor 222 is provided to the internal data bus 226. The system microprocessor 228 controls the data bus, and is provided with 32 to 128 MB of RAM 230 and up to 64 Mb of ROM 232. This microprocessor could be implemented using one of the units previously described, such as the PowerPC 604, PowerPC G3, Pentium-series, or other processors. A hard disk drive controller 234 provides access to various storage means, including, for example, an internal hard disk drive unit 236, a removable hard disk drive unit 238, a unit utilizing removable magnetic, optical, or magneto-optical media (not shown), or a tape drive 240. These storage units also enable the PC to function as a video recorder, as described above. A graphic processor 242, comprising dedicated hardware which optionally be implemented as a separate plug-in circuit board, performs the image manipulations required to convert between the various frame sizes (in pixels), aspect ratios, and frame rates. This graphics processor uses 16 to 32 MB of DRAM, and 2 to 8 MB of VRAM (depending on the type of display output desired. For frame size of 1280×720 with an aspect ratio 16:9, the lower range of DRAM and VRAM will be sufficient, but for a frame size of 1920×1080, the higher range of DRAM and VRAM is required. In general, the 1280×720 size is sufficient for conventional "multi-sync" computer display screens up to 20 inches, and the 1920×1080 size is appropriate for conventional "multi-sync" computer display screens up to 35 inches. Analog video outputs 244 are available for these various display units. Using this system, various formats may be displayed, including (for 25 fps, shown by speeding up 24 fps signals) 768×576 PAL/SECAM, 1024×576 wide-screen, and 1280×720/1920×1080 HDTV, and (for 30 and 60 fps, shown by utilizing the well-known "3:2 pull-down" technique, and for 29.97 fps, shown by a slight slow-down in 30 fps signals) 640×480 NTSC and 854×480 wide-screen, and 1920×1080 NHK (Japan) HDTV.

It will be appreciated by the skilled practitioner that most of the highest quality program material has been originated on 24 fps 35-mm film, and therefore conversions that rely on reconstituting the signal material from 25 fps or 30 fps materials into 24 fps material do not entail any loss of data or program material. In addition, signals that have been interlaced from a lower or equivalent frame rate source signal in any of the currently available means (24 fps to 25 fps via speed-up; 24 fps to 30 fps via "3:2-pull-down") may be de-interlaced and reconstituted as progressive-scan frames without introducing any signal artifacts, provided that the original frames are recreated from properly matched fields. If it is desired to produce 24 fps interlaced, 25 fps Interlaced, or 30 fps interlaced signals from higher frame rate progressive signals (such as 48 fps Progressive, 50 fps progressive, or 60 fps progressive signals, respectively) these may be obtained by interlacing these signals and discarding the redundant data. Alternatively, if it is desired to produce 24 fps progressive, 25 fps progressive, 30 fps Progressive, or 48 fps progressive signals from higher frame rate progressive signals (such as 48 fps progressive, 50 fps progressive, 60 fps progressive, or 96 fps progressive signals, respectively), these may be obtained by applying a 2:1 frame reduction. These techniques are summarized in FIG. 7A, with conversion charts showing typical process flow charts in FIGS. 7B and 7C.

Figure 8:
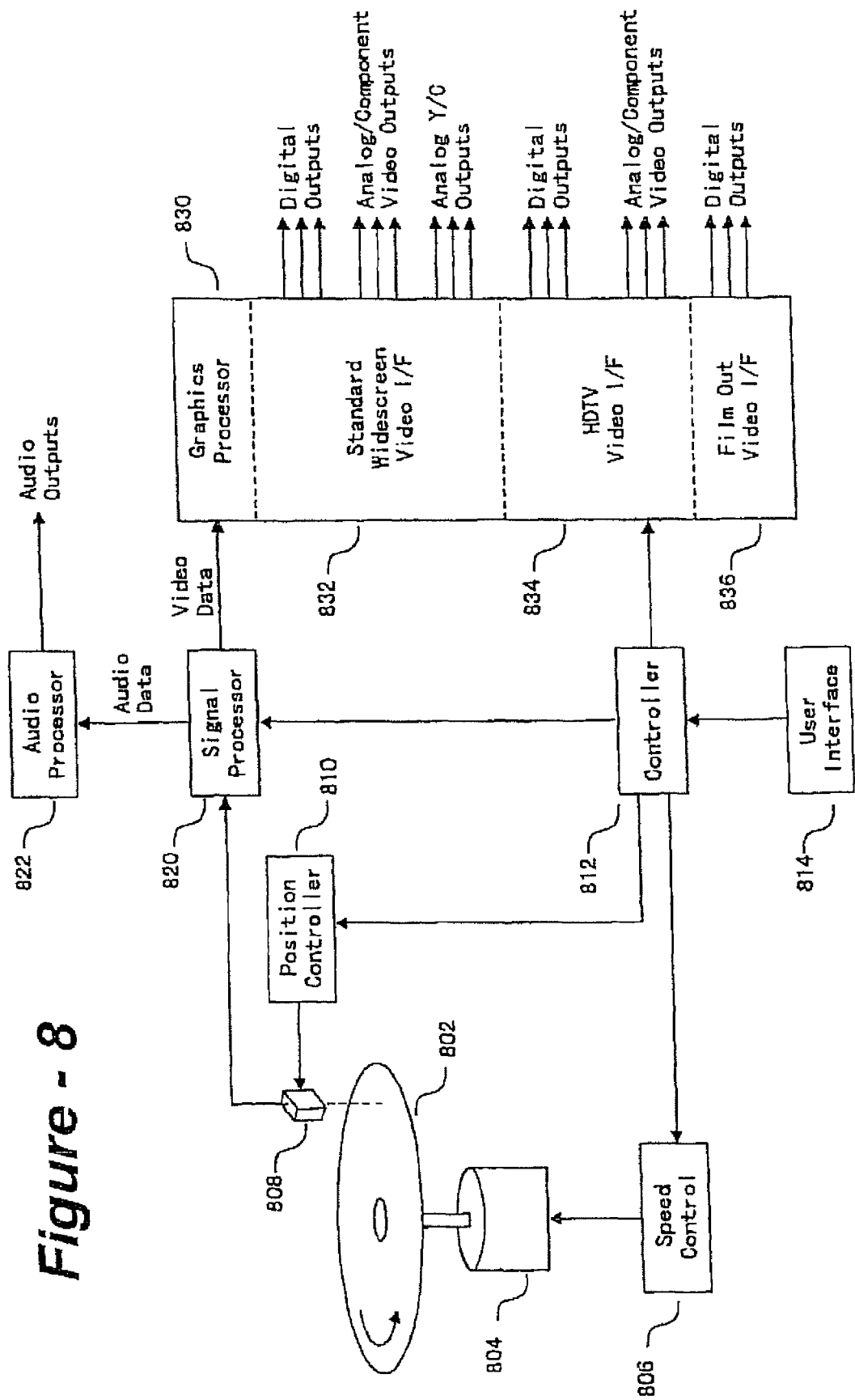
FIG. 8 shows a block diagram of an embodiment of a universal playback device for multi-format use.

FIG. 8 shows one possible implementation of a universal playback device, in accordance with the invention. By way of example, a DVD-type video disk 802 is rotatably driven by motor 804 under control of speed-control unit 806. One or more laser read- or read/write-heads 808 are positioned by position control unit 810. Both the speed control unit and the position control unit are directed by the overall system controller 812, at the direction of the user interface 814. It should be noted that the number and configuration of read- or read/write-heads will be determined by the choice of the techniques employed in the various embodiments disclosed herein above. The signals recovered from the laser heads is delivered to signal processor unit 820, and the data stream is split into an audio data stream (supplied to audio processor unit 822) and a video data stream (supplied to video graphics processor unit 830). During the audio recovery process, the alteration of the playback frame rate (for example, from 24 fps to 25 fps, accomplished by speed control adjustment) may suggest the need for pitch-correction of the audio material. This procedure, if desired, may be implemented either as part of the audio processor 822, or within a separate, external unit (not shown), as offered by a number of suppliers, such as Lexicon.

The video data stream may undergo a number of modifications within the graphics processor, shown generally at 830, depending on the desired final output format. Assuming that the output desired is NTSC or some other form of widescreen or HDTV signal output at a nominal frame rate of 30 fps, a signal sourced from the disk at 24 fps would undergo a "3:2-pull-down" modification as part of the conversion process (as explained herein above). If the signal as sourced from the disk is based on 25 fps, then it would undergo an preliminary slowdown to 24 fps before the "3:2-pull-down" processing is applied. It should be noted that the 0.1% difference between 30 fps and 29.97 fps only requires the buffering of 173 frames of video over the course of a 120-minute program, and at a data rate of 5.5 MB/sec, this corresponds to approximately 39 MB of storage (for standard/widescreen) or 79 MB of storage (for HDTV), which readily may be implemented in semiconductor-based memory. In any event, a signal supplied to the graphics processor at a nominal 24 fps simultaneously may be output at both 30 fps and 29.97 fps, in image frames compatible with both NTSC and NTSC/widescreen (the standard/widescreen video interface 832), and HDTV (HDTV video interface 834), in accordance with the invention as described herein above.

As disclosed above, an optional film output video interface 836 may be included, with digital video outputs for a film recorder. Overall, the outputs for the graphics processor 830 parallel those of the Multi-Format Audio/Video Production System as shown in FIG. 5 and disclosed herein above. In addition, for signals to be output in a format having a different aspect ratio than that of the source signal, it may be necessary to perform a horizontal and/or vertical "pan/scan" function in order to assure that the center of action in the source program material is presented within the scope of the output frame. This function may be implemented within the graphics processor by utilizing a "tracking" signal associated with the source program material, for example, as part of the data stream for each frame, or, alternatively, through a listing identifying changes that should be applied during the presentation of the source material. Where no "tracking" information is available, the image frame would be trimmed along the top and bottom, or the sides, as necessary in order to fit the aspect ratio of the source material to the aspect ratio of the output frame. This latter technique is explained herein above, with reference to FIGS. 1A-1D. In addition, the program material may include security information, such as regional or geographical information directed towards controlling the viewing of the program material within certain marketing areas or identifiable classes of equipment (such as hardware sold only in the United States or in the German market). This information, as has been disclosed for use with other disk-n and tape-based systems, often relates to issues such as legal licensing agreements for software materials. It may be processed in a way similar to the detection and application of the "pan/scan" tracking signal, and the signal processor 820, under the direction of controller 812 may act to enforce these restrictions.

Alternatively, if output at 25 fps is desired, it is a simple matter to configure the various components of this system to replay the video information of the disk 802 at this higher frame rate. The controller will configure the speed control unit 806 (if necessary) to drive the motor 804 at a greater rotational speed to sustain the increased data rate associated with the higher frame rate. The audio processor 822, if so equipped, will be configured to correct for the change in pitch associated with the higher frame rate, and the graphics processor will be configured to provide all output signals at the 25 fps frame rate. As Alternate method for audio pitch correction, additional audio data can be stored in disk which is already corrected. When the frame rate is changed, the corresponding audio data is selected in accordance with the invention.

As yet another alternative, materials produced at 25 fps and stored on the disk-based mass storage means of this example could originate from conventional standard or widescreen PAL format signals. Utilizing the slow-down method, these signals are readily converted to 24 fps frame rate, from which conversion to various 30 fps formats is implemented, as disclosed herein above. This feature has significance in the commercial development of HDTV, as the ability to utilize more-or-less conventional PAL format equipment greatly facilitates the economical production and origination of materials intended for HDTV markets.

A wide range of output frame rates may be made available through combination of the techniques of speed-up, slow-down, "3-2-pull-down," and other related field-rearrangement, de-interlacing, interlacing/de-interlacing, frame repetition, and frame reduction techniques, as disclosed herein above with respect to FIG. 4 and FIGS. 7A-7E, and these various combinations and approaches should be considered to be within the scope of the invention. In addition, these techniques may be combined with hardware and/or software which perform image manipulations such as line-doubling, line-quadrupling, deinterlacing, etc., such that the display device will be capable of providing smoother apparent motion, by increasing the display rate without increasing the actual data/information rate. One example would be to process the 24 fps signal from the internal format to convert it into a 48 fps signal, using field-doubling techniques such as deinterlacing and line doubling. Then, the process would employ frame-store techniques to provide a frame-repeated output at a rate of 96 fps. These types of display-related improvements, in conjunction with the instant invention, should also be considered to be within the scope of the invention as disclosed herein. Examples of these various combinations and conversion methods are included in the table of FIG. 7A and the chart of FIG. 7E.

In general, the features as described need not all be provided in a single unit, but rather may be distributed through various external units (such as external data-recorders or display units). In addition, particular configurations of the system may include only the graphics capabilities required for that application (such as the use of 25 fps PAL outputs, but not 30 fps NTSC) and may even exclude certain options (such as printer outputs), and these variations should be considered to be within the scope of the invention.

I claim:

1. A method of producing a video program, comprising:
   receiving an input video image at a portable audio/video recording device;
   converting the input video image into a digital production format by sampling the input video image at a sampling frequency in excess of 18 megahertz;
   employing high-capacity digital video storage equipped with asynchronous program recording and reproducing facilities to perform a frame-rate conversion; and
   processing video image data in the digital production format using the high-capacity video storage on a selective basis to output a version of a video program having a desired frame rate and image dimensions in pixels.

2. The method of claim 1, wherein the portable audio/video recording device comprises one of a camera or camcorder.

3. A portable audio/video recording device, comprising:
   an image sensor, having pixel dimensions of at least 1024×576;
   a graphics processor to facilitate conversion of an input video image into a digital production format by sampling the input video image at a sampling frequency in excess of 18 megahertz;
   high-capacity digital video storage equipped with asynchronous program recording and reproducing components configured to facilitate a frame-rate conversion; and
   output circuitry to process video image data in the production format using the high-capacity video storage on a selective basis to output a version of a video program having a selected frame rate and image dimensions in pixels.

4. The device of claim 3, wherein the portable audio/video recording device comprises one of a camera or camcorder.

5. The method of claim 1, wherein the digital production format comprises a frame rate of 24 frames per second (fps), and the output version of the video program has a progressive format having an image dimension of 1920×1080 pixels and a frame rate of 60 fps.

6. The method of claim 1, wherein the digital production format comprises a frame rate of 24 frames per second (fps), and the output version of the video program has a progressive format having an image dimension of 1920×1080 pixels and a frame rate of 30 fps.

7. The method of claim 1, wherein the digital production format comprises a frame rate of 24 frames per second (fps), and the output version of the video program has a progressive format having an image dimension of 1280×720 pixels and a frame rate of 60 fps.

8. The method of claim 1, the video output format is a progressive format having an image dimension of 3840×2160 pixels.

9. The method of claim 1, further comprising:
   recording a first portion of the video program onto a first storage means until the first storage means is full; and
   recording a remainder of the video program onto a second storage means.

10. The method of claim 9, wherein at least one of the first and second storage means comprises a removable storage device.

11. The method of claim 1, further comprising implementing a 3:2 pulldown technique to perform a frame rate conversion.

12. The method of claim 1, further comprising employing inter-frame interpolation to perform a frame-rate conversion.

13. The method of claim 1, wherein the desired image dimension in pixels is different than an image dimension in pixels of the digital production format, the method further comprising performing intra-frame interpolation of pixel data to obtain video image frames having the desired image dimension in pixels.

14. The method of claim 1, further comprising recording output video on the high-capacity digital video storage in a compressed format.

15. The device of claim 3, wherein the digital production format comprises a frame rate of 24 frames per second (fps), and the output version of the video program has a progressive format having an image dimension of 1920×1080 pixels and a frame rate of 60 fps.

16. The device of claim 3, wherein the digital production format comprises a frame rate of 24 frames per second (fps), and the output version of the video program has a progressive format having an image dimension of 1920×1080 pixels and a frame rate of 30 fps.

17. The device of claim 3, wherein the digital production format comprises a frame rate of 24 frames per second (fps), and the output version of the video program has a progressive format having an image dimension of 1280×720 pixels and a frame rate of 60 fps.

18. The device of claim 3, wherein the video output format is a progressive format having an image dimension of 3840×2160 pixels.

19. The device of claim 3, wherein the device is configured to:
   record a first portion of the video program onto a first storage means until the first storage means is full, and
   record a remainder of the video program onto a second storage means.

20. The device of claim 19, wherein at least one of the first and second storage means comprises a removable semiconductor storage device.

21. The device of claim 3, wherein the device is configured to implement a 3:2 pulldown technique to perform a frame rate conversion.

22. The device of claim 3, wherein the device is configured to employ inter-frame interpolation to perform a frame-rate conversion.

23. The device of claim 3, further comprising pixel interpolation hardware, wherein the selected image dimension in pixels is different than an image dimension in pixels of the digital production format, and the apparatus is further configured to perform intra-frame interpolation of pixel data using the pixel interpolation hardware to obtain video image frames having the selected image dimension in pixels.

24. A method performed by a portable video image recording device including an image sensor and high-capacity digital storage means supporting asynchronous access for recording and reproducing, the method comprising:
   receiving an input video image at the image sensor;
   sampling an output of the image sensor using a sampling frequency of at least 30 megahertz to generate video image data having an internal format employing a first frame rate and having a first image dimension in pixels;

recording a video program comprising video image data in the internal format using the high-capacity digital storage means; and performing manipulation of video image data in the internal format on a selective basis to output video content in an output video format having a second frame rate different than the first frame rate and a selected image dimension in pixels.

25. The method of claim 24, wherein the portable video recording device comprises one of a camera or camcorder.

26. The method of claim 24, wherein the first frame rate is 24 frames per second (fps), and the video output format is a progressive format having an image dimension of 1920×1080 pixels and a frame rate of 60 fps.

27. The method of claim 24, wherein the first frame rate is 24 frames per second (fps), and the video output format is a progressive format having an image dimension of 1920×1080 pixels and a frame rate of 30 fps.

28. The method of claim 24, wherein the first frame rate is 24 frames per second (fps), and the video output format is a progressive format having an image dimension of 1920×1080 pixels and a frame rate that is one of 48 fps or 96 fps.

29. The method of claim 24, wherein the first frame rate is 24 frames per second (fps), and the video output format is a progressive format having an image dimension of 1920×1080 pixels and a frame rate of 30 fps.

30. The method of claim 24, wherein the first frame rate is 24 frames per second (fps), and the video output format is a progressive format having an image dimension of 1280×720 pixels and a frame rate of 60 fps.

31. The method of claim 24, wherein the first frame rate is 24 frames per second (fps), and the video output format is a progressive format having an image dimension of 3840×2160 pixels.

32. The method of claim 24, further comprising:
recording a first portion of the video content onto a first semiconductor memory device until the first removable semiconductor memory device is full, and
recording a remainder of the video content onto a second semiconductor memory device.

33. The method of claim 24, wherein at least one of the first and second semiconductor storage device is removable.

34. The method of claim 24, wherein manipulation of the video content comprises implementing a 3:2 pulldown technique to perform a frame rate conversion.

35. The method of claim 24, wherein the manipulation of the video content results in a frame-rate change produced by inter-frame interpolation.

36. The method of claim 24, wherein the desired image dimension in pixels is different than the first image dimension in pixels, and manipulation of the video content comprises intra-frame interpolation of pixel data.

37. The method of claim 24, wherein the image sensor output is sampled using a 4:2:2 sampling scheme having a precision of at least 10 bits.

38. The method of claim 24, wherein video image data in the internal format is recorded in a compressed format on at least one high-capacity storage device, and further wherein performing manipulation of video image data in the internal format comprises:
retrieving recorded video content from the at least one high-capacity digital storage device;
decompressing the retrieved recorded video content to extract image frame content; and
manipulating image data in the image frame content.

39. A portable video recording device, comprising:
an image sensor, configured to output pixel image data having a pixel resolution of at least 1280×720;
a graphics processor configured to sample pixel image data output from the image sensor at a sampling frequency of at least 30 megahertz to generate video content having an internal format employing a first frame rate and having a first image dimension in pixels;
high-capacity digital video storage means configured to facilitate asynchronous video content recording and reproducing; and
digital signal processing circuitry,
wherein the device is further configured to,
store video image data contained in the internal format in a compressed format on the high-capacity digital video storage means to create a recorded video program; and
perform manipulation of video image data in the internal format with the digital processing circuitry on a selective basis to output video content in an output video format having a second frame rate different than the first frame rate and an image dimension in pixels of at least 1280×720.

40. The device of claim 39, wherein the internal format comprises a frame rate of 24 frames per second (fps), and the output version of the video program has a progressive format having an image dimension of 1920×1080 pixels and a frame rate of 60 fps.

41. The device of claim 39, wherein the internal format comprises a frame rate of 24 frames per second (fps), and the output version of the video program has a progressive format having an image dimension of 1920×1080 pixels and a frame rate of 30 fps.

42. The device of claim 39, wherein the internal format comprises a frame rate of 24 frames per second (fps), and the output version of the video program has a progressive format having an image dimension of 1280×720 pixels and a frame rate of 60 fps.

43. The device of claim 39, wherein the video output format is a progressive format having an image dimension of 3840×2160 pixels.

44. The device of claim 39, wherein the device is further configured to:
retrieve compressed video content from the high-capacity digital video storage means;
decompress the retrieved compressed video content to an uncompressed format to extract frames of video image data; and
perform manipulation of video image data in the frames to implement a frame-rate conversion from the first frame rate to the second frame rate using at least one of 3:2 pulldown and inter-frame interpolation.

45. The device of claim 23, further comprising pixel interpolation hardware configured to generate output video content having a second image dimension that is different than the first image dimension in pixels by performing an intra-frame interpolation of the video image data in the frames.

46. The device of claim 39, wherein the device is further configured to output the output video content using a digital signal having an output video format compatible with an HDTV video format.

47. The device of claim 39, wherein the device the high-capacity digital video storage means includes a memory buffer, and video content is stored in the internal format by storing frames of image data in the memory buffer.

48. The device of claim 39, wherein the image sensor is sampled using a 4:2:2 sampling scheme using sampling precision of at least 10 bits.

\* \* \* \* \*